US011917127B2

(12) United States Patent
He et al.

(10) Patent No.: US 11,917,127 B2
(45) Date of Patent: *Feb. 27, 2024

(54) MONITORING OF VIDEO STREAMING EVENTS

(71) Applicant: InterDigital Madison Patent Holdings, SAS, Paris (FR)

(72) Inventors: Yong He, San Diego, CA (US); Yan Ye, San Diego, CA (US); Ahmed Hamza, Montreal (CA)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,222

(22) Filed: Feb. 17, 2023

(65) Prior Publication Data
US 2023/0209040 A1 Jun. 29, 2023

Related U.S. Application Data

(63) Continuation of application No. 17/040,028, filed as application No. PCT/US2019/023159 on Mar. 20, 2019, now Pat. No. 11,616,942.
(Continued)

(51) Int. Cl.
*H04N 7/00* (2011.01)
*H04N 17/04* (2006.01)
(Continued)

(52) U.S. Cl.
CPC .......... *H04N 17/04* (2013.01); *H04N 13/158* (2018.05); *H04N 13/194* (2018.05);
(Continued)

(58) Field of Classification Search
CPC .... H04N 17/04; H04N 13/158; H04N 13/194; H04N 13/282; H04N 21/21805;
(Continued)

(56) References Cited

U.S. PATENT DOCUMENTS

2007/0229397 A1  10/2007  Sefton
2013/0169644 A1   7/2013  Bolton
(Continued)

FOREIGN PATENT DOCUMENTS

CN   102474510 A   5/2012
CN   102986218 A   3/2013
(Continued)

OTHER PUBLICATIONS

International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.
(Continued)

*Primary Examiner* — Masum Billah
(74) *Attorney, Agent, or Firm* — Smadar Gefen

(57) ABSTRACT

Systems and methods described herein provide for monitoring of video streaming events. Techniques disclosed include rendering a first omnidirectional video associated with a first viewpoint. In response to a request to access an omnidirectional video associated with another viewpoint, a time of the request and information identifying the other viewpoint is recorded. Techniques disclosed also include identifying a time of switching into rendering of a second omnidirectional video associated with a second viewpoint, and reporting a viewpoint switching latency, representing a difference between the identified switching time and a recorded request time associated with information identifying the second viewpoint.

21 Claims, 17 Drawing Sheets

Related U.S. Application Data

(60) Provisional application No. 62/737,657, filed on Sep. 27, 2018, provisional application No. 62/699,501, filed on Jul. 17, 2018, provisional application No. 62/693,177, filed on Jul. 2, 2018, provisional application No. 62/676,750, filed on May 25, 2018.

(51) Int. Cl.

| | | |
|---|---|---|
| *H04N 13/106* | (2018.01) | |
| *H04N 13/194* | (2018.01) | |
| *H04N 13/282* | (2018.01) | |
| *H04N 21/218* | (2011.01) | |
| *H04N 21/442* | (2011.01) | |
| *H04N 21/81* | (2011.01) | |

(52) U.S. Cl.
CPC ..... *H04N 13/282* (2018.05); *H04N 21/21805* (2013.01); *H04N 21/44209* (2013.01); *H04N 21/816* (2013.01)

(58) Field of Classification Search
CPC ........... H04N 21/44209; H04N 21/816; H04N 21/6587; H04N 21/23439; H04N 21/4728; H04N 5/23238; H04N 5/3415; H04N 2013/0088; H04N 21/234345; H04N 21/2393; H04N 21/435; H04N 21/44218; H04N 21/4825; H04N 21/812; H04N 19/107; G06T 3/4038; G06F 16/40; H04L 65/602
USPC .......................................................... 348/36
See application file for complete search history.

(56) References Cited

U.S. PATENT DOCUMENTS

| | | | |
|---|---|---|---|
| 2013/0286879 A1 | 10/2013 | Elarabawy et al. | |
| 2015/0249813 A1 | 9/2015 | Cole et al. | |
| 2015/0346812 A1 | 12/2015 | Cole et al. | |
| 2017/0118458 A1 | 4/2017 | Grönholm et al. | |
| 2017/0188058 A1 | 6/2017 | Nakashima et al. | |
| 2017/0230692 A1 | 8/2017 | Nakashima et al. | |
| 2017/0237964 A1 | 8/2017 | Mäenpää | |
| 2017/0237983 A1 | 8/2017 | Adsumilli et al. | |
| 2017/0270635 A1 | 9/2017 | Chun et al. | |
| 2017/0289221 A1 | 10/2017 | Khalid et al. | |
| 2017/0316607 A1 | 11/2017 | Khalid et al. | |
| 2017/0316806 A1 | 11/2017 | Warren et al. | |
| 2018/0077210 A1 | 3/2018 | Hannuksela et al. | |
| 2018/0091866 A1 | 3/2018 | Sun et al. | |
| 2018/0124374 A1 | 5/2018 | Smith | |
| 2018/0376126 A1 | 12/2018 | Hannuksela | |
| 2019/0158815 A1 | 5/2019 | He et al. | |
| 2019/0238609 A1* | 8/2019 | Skupin | H04L 65/762 |
| 2019/0246094 A1* | 8/2019 | Mate | G06F 3/011 |
| 2019/0362151 A1 | 11/2019 | Stokking et al. | |
| 2020/0037029 A1 | 1/2020 | He et al. | |
| 2020/0107007 A1 | 4/2020 | Yip et al. | |

FOREIGN PATENT DOCUMENTS

| | | | |
|---|---|---|---|
| CN | 103702099 A | 4/2014 | |
| CN | 104735464 A | 6/2015 | |
| CN | 107439010 A | 12/2017 | |
| CN | 107735152 A | 2/2018 | |
| EP | 3367626 A1 | 8/2018 | |
| GB | 2523554 A * | 9/2015 | ........... G02B 27/017 |
| GB | 2523554 A | 9/2015 | |
| WO | WO2015184416 A1 | 12/2015 | |
| WO | WO2017205794 A1 | 11/2017 | |
| WO | WO2018009746 A1 | 1/2018 | |
| WO | WO2018035133 A1 | 2/2018 | |
| WO | WO2018045108 A1 | 3/2018 | |
| WO | WO2018049221 A1 | 3/2018 | |

OTHER PUBLICATIONS

International Organization for Standardization, "Information technology—Coded Representation of Immersive Media (MPEG-I)—Part 2: Omnidirectional Media Format". ISO/IEC JTC1/SC29/WG11, N17399, Feb. 7, 2018, 181 pages.

He, Yong, et al., "WD 3 of ISO/IEC 23090-6 Immersive Media Metrics". International Organization For Standardization, ISO/IEC JTC1/SC29/WG11, N17564, Apr. 2018, 14 pages.

Wang et al., "Signalling of most interested regions of VR videos", ISO/IEC JTC1/SC29/WG11 MPEG2016/M38559 Geneva, Switzerland, pp. 1-3, May-Jun. 2016.

International Search Report and Written Opinion of the International Searching Authority for PCT/US2019/023159 dated May 22, 2019, 12 pages.

Wang, Ye-Kui, et. al., "OMAF Editor's Input Text for OMAF WD Based on Filand AHG Agreements". International Organization for Standardization, ISO/IEC JTC1/SC29/WG11 M42923, Jul. 2018.

He, Yong, et al., "Immersive Media Metrics Under Considerations". International Organization for Standardization, ISO/IEC JTC1/SC29/WG11, N17239, Oct. 2017, 6 pages.

Wang, Ye-Kui, et al., "WD 1 of ISO/IEC 23090-2 OMAF 2nd Edition". International Organization For Standardization, ISO/IEC JTC1/SC29/WG11, N17584, Apr. 2018, 191 pages.

Hamza, Ahmed., et. al., "[MPEG-I] Measurement Guidelines for VR Metrics in MPEG-I Part 6 WD International Organization for Standardization", MPEG Meeting, Motion Picture Expert Group, ISO/IEC JTC1/SC29/WG11, No. M43356, Jul. 2018, 6 pages.

Wang, Yueming, et al., "Efficient Projections for Immersive Video Coding and Transmission", ZTE Technology Journal, Nov. 8, 2017, 50-55.

He, Yong, et. al., "2nd WD of ISO/IEC 23090-6 Immersive Media Metrics". International Organization for Standardization, ISO/IEC JTC1/SC29/WG11, N17400, Jan. 2018, 13 pages.

Wang, Ye-Kui, "An Overview of Omnidirectional MediA Format (OMAF)". Qualcomm, Dec. 10, 2017, 105 pages.

He, Yong, et al., "[MPEG-I] Part 6 Immersive Media Metrics". International Organization for Standardization, MPEG Meeting, Motion Picture Expert Group, ISO/IEC JTC1/SC29/WG11, No. M42107, Jan. 16, 2018, 9 pages.

Gwangju (Motion Picture Expert Group or ISO/IEC JTC1/SC29/WG11)https://mpeg.chiariglione.org/meetings/121.

International Standard, "Information Technology—Generic Coding of Moving Pictures and Associated Audio Information: Systems" ISO/IEC 13818-1, second edition, Dec. 1, 2000, 174 pages.

Le Feuvre, J., et al., "Describing Tile Regions in ISOBMFF", Telecom ParisTech, Canon Research Centre France, ISO/IEC JTC1/SC29/WG11 MPEG2016/m38644, May 2016, 3 pages.

D'Acunto et al., "MPD signaling of 360 content properties for VR applications", 1 15. MPEG Meeting; May 30, 2016-Mar. 6, 2016; Geneva; (Motion Picture Expert Group or ISO/IEC JTCI/SC29/WGI I ) , No. m38605, May 25, 2016, 16 pages.

International Standard, "Information Technology-Coding of Audiovisual Objects Part 12: ISO Base Media File Format", ISO/IEC 14496-12, fifth edition, Feb. 20, 2015, 256 pages.

Invitation to pay additional fees, and where applicable, protest fee for PCT/US2017/050766 mailed Nov. 16, 2017, 13 pages.

"ISO/IEC 23009-5:2017—Information technology—Dynamic adaptive streaming over HTTP (DASH)—Part 5: Server and network assisted DASH (SAND)", May 2017, 2 pages.

ISO/IEC, MPEG-DASH: "The Standard for Multimedia Streaming Over Internet", ISO/IEC W13533, 2012, 6 pages.

Kuzyakov, et al., "Next-generation video encoding techniques for 360 video and VR", Online: [facebook] Video engineering, virtual reality, https://code.facebook.com/posts/1126354007399553. Jan. 21, 2016, 5 pages.

Boyce et al., "Draft High Efficiency Video Coding (HEVC) Version 2, Combined Format Range Extensions (RExt), Scalability (SHVC), and Multi-View (MV-HEVC) Extensions", Joint Collaborative Team on Video Coding (JCT-VC) of ITU-T SG 16 WP 3 and ISO/IEC JTC 1/SC 29/WG 11, Document: JCTVC-R1013_v6, 18th Meeting: Sapporo, Japan, Jun. 30, 2014, 535 pages.

(56) References Cited

OTHER PUBLICATIONS

International Search Report and Written Opinion of the International Searching Authority for PCT/US2017/050766 dated Jan. 11, 2018, 15 pages.
International Preliminary Report on Patentability PCT/US2019/023159 dated Sep. 22, 2020, 8 pages.
Wang, Y-K, et. al., "Tile Based VR Video Encoding and Decoding Schemes", Joint Collaborative Team on Video Coding (JCT-VC), Document No. JCTVC-X0077, May 2016, 6 pages.
International Preliminary Report on Patentability for PCT/US2017/050766 dated Mar. 12, 2019, 10 pages.
Facebook Engineering, "Encoding for 360 Video and VR", Retrieved from https://www.facebook.com/ Engineering/videos/10153781047207200/, Jan. 21, 2016, 27 pages.
Lee, et al., "Region Description Of 360-Degree Video (VR video) in DASH", LG Electronics, ISO/IEC JTC1/SC29/WG11 MPEG2016/M38568, May-Jun. 2016, 5 pages.
Yong He (Interdigital) et al: "[MPEG-I] Immersive Media Metrics", 123. MPEG Meeting; Jul. 16, 2018-Jul. 20, 2018; Ljubljana; (Motion Picture Expert Group or ISO/IEC JTC1/SC29/WG11), No. m43375, Jul. 6, 2018 (Jul. 6, 2018), 4 pages.

* cited by examiner

| $qr_1(1,L)=4$ | $qr_1(2,H)=1$ | $qr_1(3,H)=1$ | $qr_1(4,L)=4$ |
|---|---|---|---|
| $qr_1(5,L)=4$ | $qr_1(6,H)=1$ | $qr_1(7,H)=1$ | $qr_1(8,L)=4$ |
| $qr_1(9,L)=5$ | $qr_1(10,L)=3$ | $qr_1(11,L)=3$ | $qr_1(12,L)=5$ |

| $qr_2(1,L)=3$ | $qr_2(2,L)=3$ | $qr_2(3,L)=4$ | $qr_2(4,L)=5$ |
|---|---|---|---|
| $qr_2(5,H)=1$ | $qr_2(6,H)=1$ | $qr_2(7,L)=3$ | $qr_2(8,L)=5$ |
| $qr_2(9,H)=1$ | $qr_2(10,H)=1$ | $qr_2(11,L)=3$ | $qr_2(12,L)=5$ |

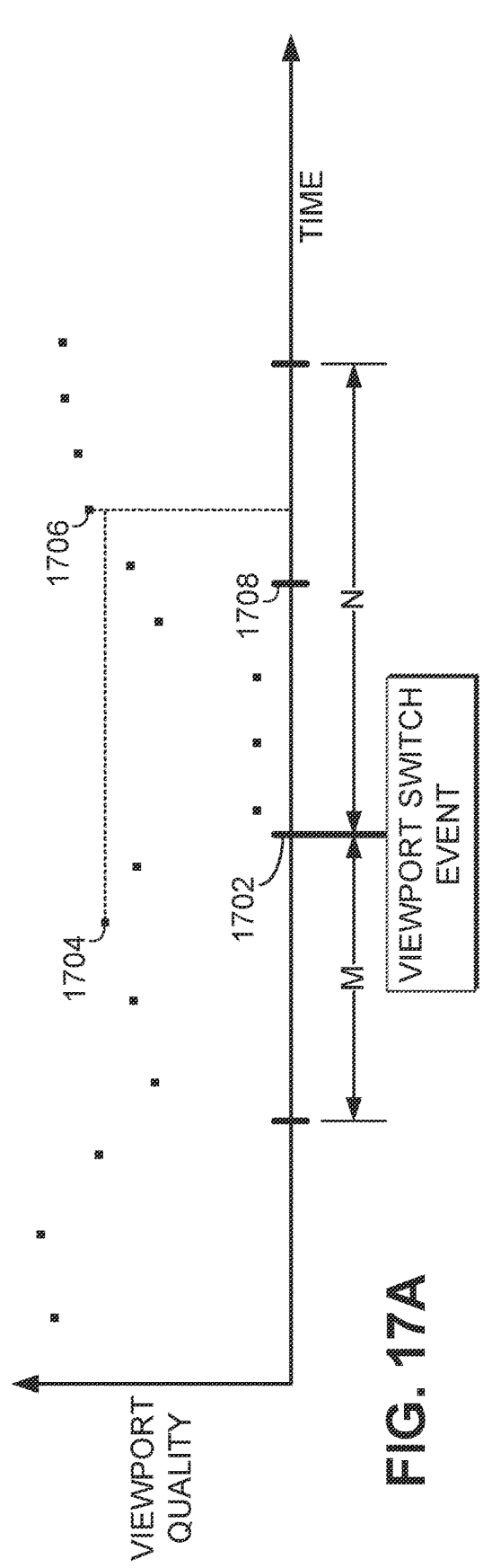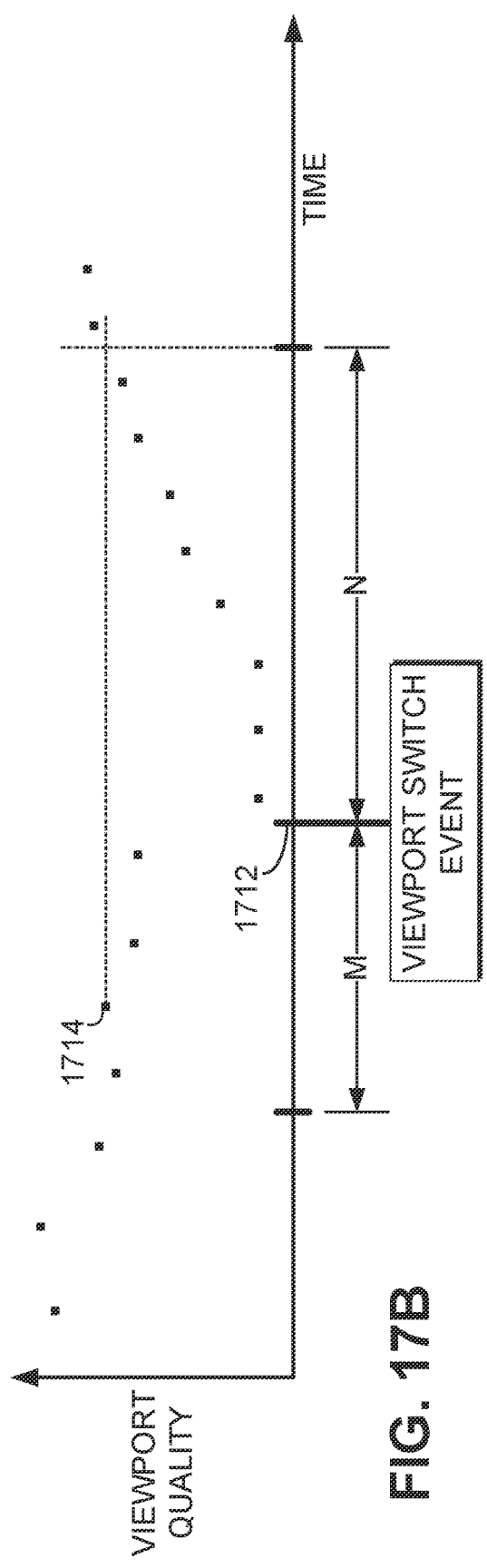

MONITORING OF VIDEO STREAMING EVENTS

CROSS-REFERENCE TO RELATED APPLICATIONS

The present application is a continuation of U.S. application Ser. No. 17/040,028, filed Sep. 21, 2020, which is a National Stage Entry under 35 U.S.C. § 371 of International Application No. PCT/US2019/023159, filed Mar. 20, 2019, which claims priority from: U.S. Provisional Patent Application No. 62/737,657 filed (Sep. 27, 2018), and U.S. Provisional Patent Application No. 62/699,501 filed (Jul. 17, 2018), and U.S. Provisional Patent Application No. 62/693,177 filed (Jul. 2, 2018), and U.S. Provisional Patent Application No. 62/646,750 (filed Mar. 22, 2018), all of which are incorporated herein by reference in their entirety.

BACKGROUND

360° video is a rapidly growing new format emerging in the media industry. It is enabled by the growing availability of VR devices and able to provide the viewer a very new sense of presence. Compared to conventional rectilinear video (2D or 3D), 360° video poses a new and difficult set of engineering challenges on video processing and delivery. Enabling comfort and immersive user experience calls for high video quality and very low latency, while the large video size can be an impediment to delivery of 360° video with high quality.

SUMMARY

In some embodiments, a method performed by an omnidirectional video player includes: rendering a portion of an omnidirectional video to a viewport; logging a plurality of viewport quality measurements of the viewport and associated measurement times; detecting a viewport switch event; from among the viewport quality measurements, selecting a pre-switch measurement time such that (i) the selected pre-switch measurement time is within a predetermined pre-switch interval before the viewport switch event and (ii) the viewport quality measurement associated with the selected pre-switch measurement time is a maximum viewport quality measurement within the pre-switch interval; from among the viewport quality measurements, selecting a post-switch measurement time such that (i) the selected post-switch measurement time is within a predetermined post-switch interval after the viewport switch event and (ii) the selected post-switch measurement time has an associated viewport quality measurement comparable to (e.g. at least as great as) the maximum viewport quality measurement within the pre-switch interval; and reporting a latency value, where the latency value represents an interval between the selected pre-switch measurement time and the selected post-switch measurement time.

In some embodiments, the omnidirectional video comprises a plurality of sub-pictures, and wherein rendering a portion of an omnidirectional video to a viewport comprises rendering an active set of at least one of the sub-pictures. In some such embodiments, detecting a viewport switch event comprises detecting an addition of a new sub-picture to the active set. In some embodiments, each sub-picture in the active set is associated with a sub-picture quality level, and the viewport quality measurement is determined based on the sub-picture quality levels of sub-pictures in the active set. For example, the viewport quality measurement may be calculated using a weighted average of quality levels of sub-pictures in the active set, wherein the quality levels are weighted by the area of the viewport being covered by the respective sub-picture.

In some embodiments, the player reports the duration M of the pre-switch interval and the duration N of the post-switch interval along with the latency. In some embodiments, the player receives from a server an indication of values of M and N to be used.

In some embodiments, the logging of the plurality of viewport quality measurements and associated measurement times is performed on a periodic basis. The period may be less than a minimum value of the pre-switch interval and the post-switch interval.

In some embodiments, the player reports the viewport quality measurement associated with the selected pre-switch measurement time and the viewport quality measurement associated with the selected post-switch measurement time.

In some embodiments, the selected pre-switch measurement time is the latest pre-switch measurement time having an associated viewport quality measurement equal to the maximum viewport quality measurement within the pre-switch interval. In some embodiments, the selected post-switch measurement time is the earliest post-switch measurement time having an associated viewport quality measurement at least as great as the maximum viewport quality measurement within the pre-switch interval.

Further embodiments include player devices operative to perform the embodiments described herein. In some embodiments, a player device or other system includes a processor, a display, and a non-transitory computer-readable storage medium storing instructions operative when executed on the processor to perform the methods described herein.

BRIEF DESCRIPTION OF THE DRAWINGS

FIG. 12 illustrates an example of a first viewport, first active viewport representation set and quality ranking value.

FIG. 13 illustrates an example of a second viewport, second active viewport representation set and quality ranking value.

FIGS. 17A-17B are schematic graphs of logged viewport quality measurements over time, illustrating selection of pre-switch and post-switch measurement times according to some embodiments.

EXAMPLE NETWORKS FOR IMPLEMENTATION OF THE EMBODIMENTS

Figure 1A:
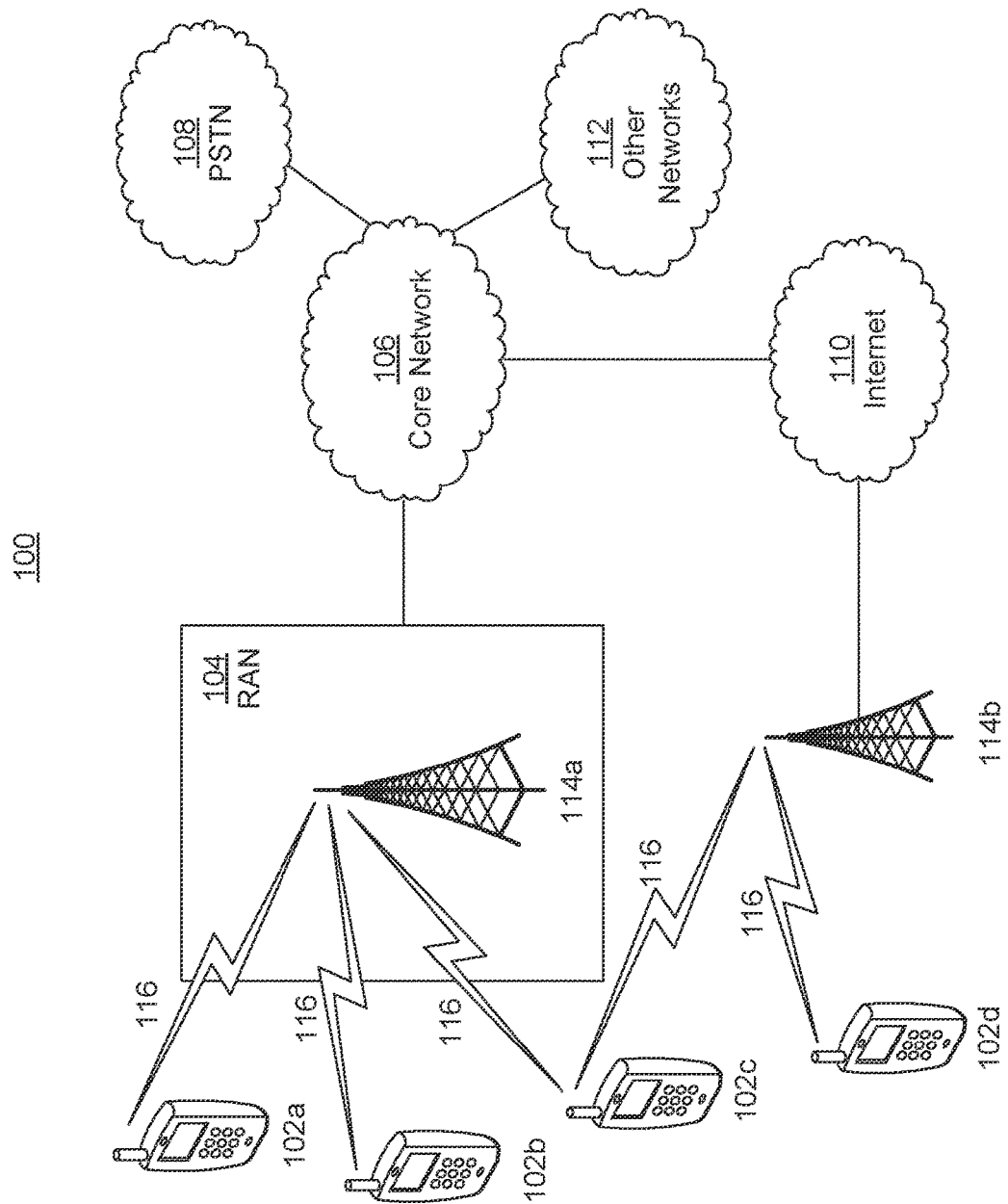
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
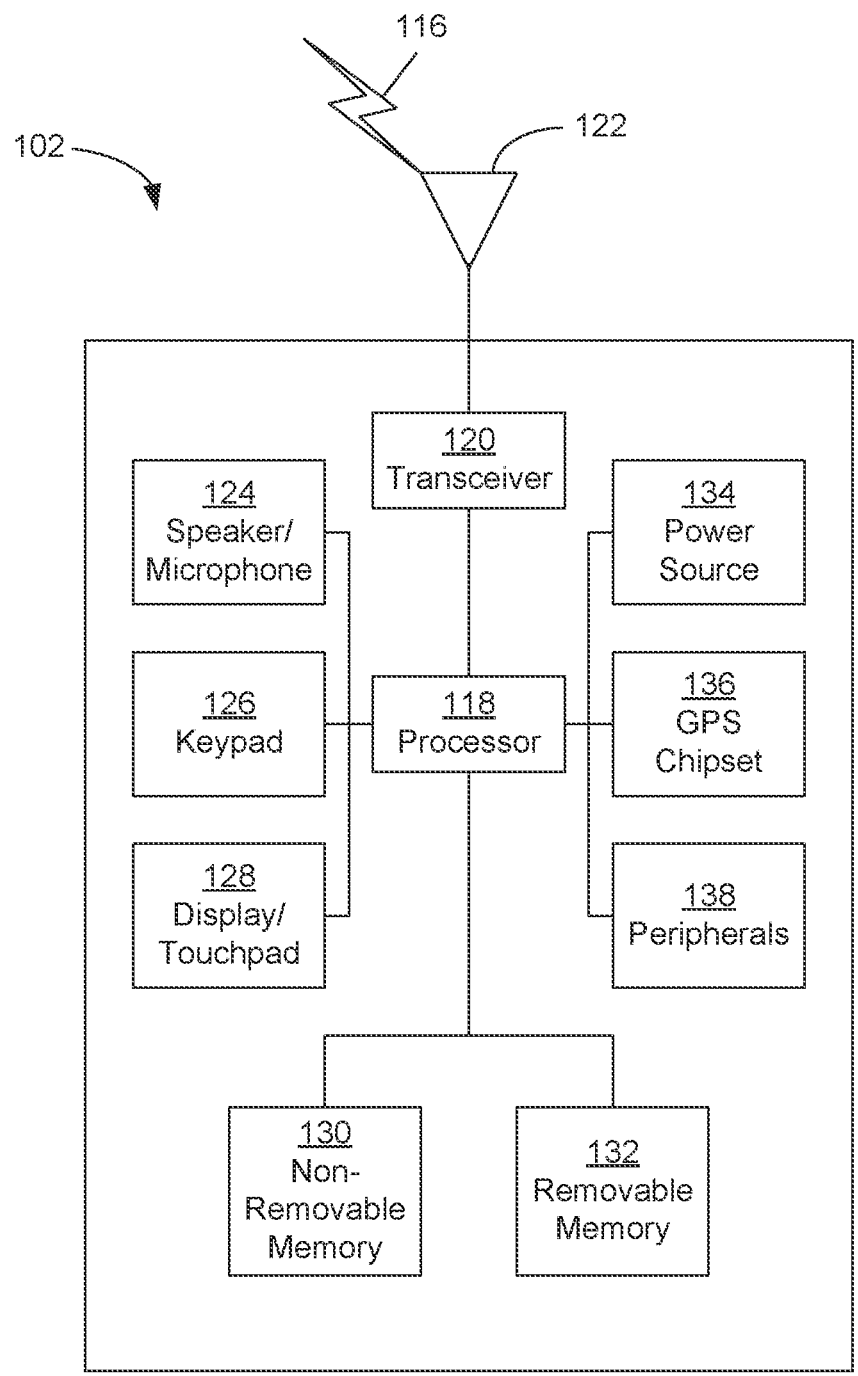
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

In view of FIGS. 1A-1B, and the corresponding description, one or more, or all, of the functions described herein with regard to one or more of: WTRU 102*a-d,* Base Station 114*a-b,* eNode-B 160*a-c,* MME 162, SGW 164, PGW 166, gNB 180*a-c,* AMF 182*a-b,* UPF 184*a-b,* SMF 183*a-b,* DN 185*a-b,* and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Dynamic Streaming over HTTP (DASH)

MPEG Dynamic Adaptive Streaming over HTTP (MPEG-DASH) is a delivery format that provides end users with a good quality video experience by dynamically adapting to changing network conditions.

Dynamic HTTP streaming calls for various bitrate alternatives of the multimedia content to be available at the server. In addition, the multimedia content may consist of several media components (e.g. audio, video, text), each of which may have different characteristics. In MPEG-DASH, these characteristics are described by Media Presentation Description (MPD).

Figure 2:
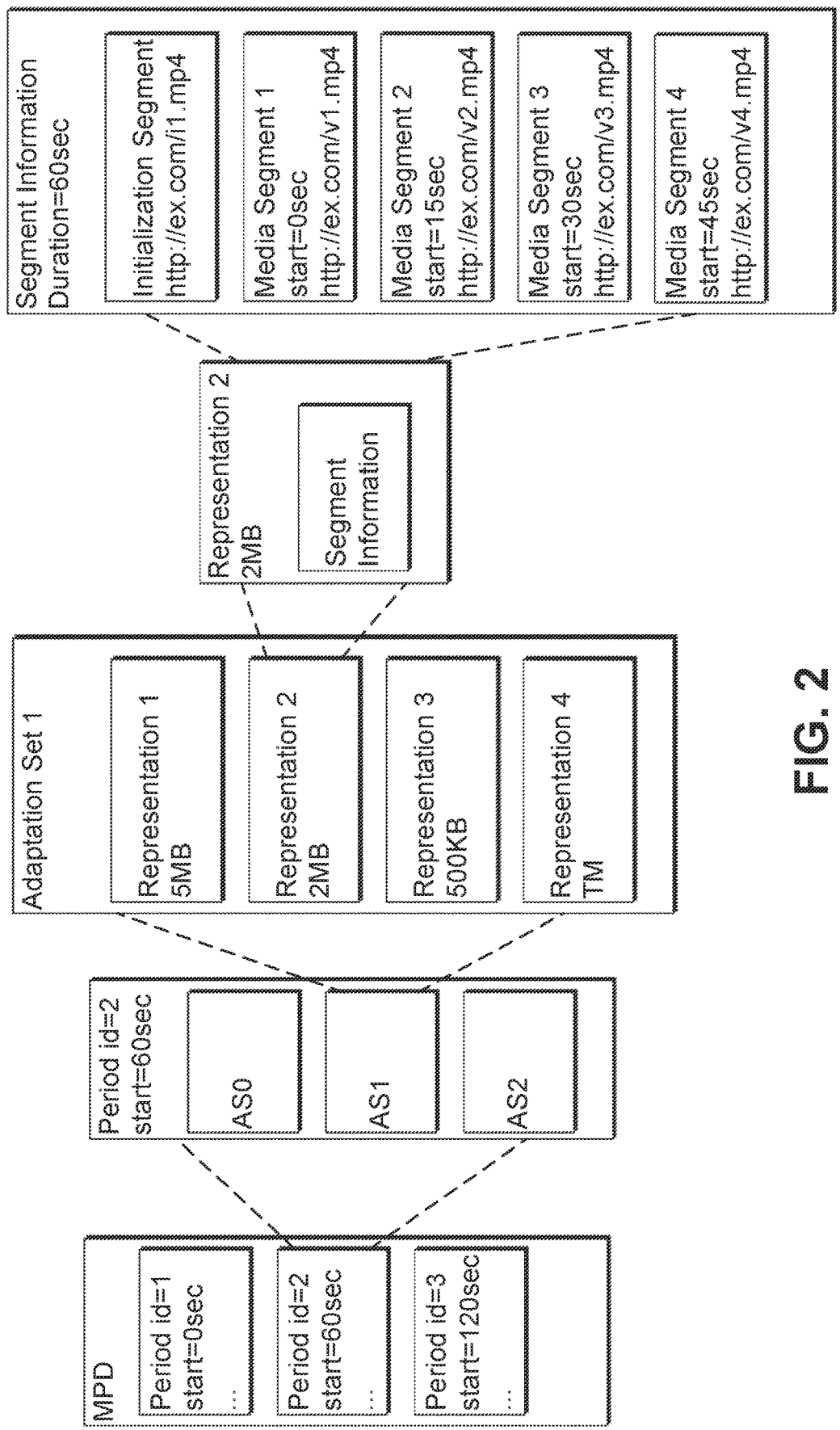
FIG. 2 illustrates a media presentation description (MPD) hierarchical data model.

FIG. 2 illustrates an MPD hierarchical data model. The MPD describes the sequence of periods, where a consistent set of encoded versions of the media content components does not change during a period. Each period has a starting time and duration and is composed of one or multiple adaptation sets.

An adaptation aet represents a set of encoded versions of one or several media content components sharing properties such as the language, the media type, the picture aspect ratio, the role, the accessibility, the viewpoint and the rating property. For instance, an adaptation set may contain different bitrates of the video component of the same multimedia content. Another adaptation set may contain different bitrates of the audio component (e.g. lower quality stereo and higher quality surround sound) of the same multimedia content. Each adaptation set usually includes multiple representations.

A representation describes a deliverable encoded version of one or several media components, differing from other representations by bitrate, resolution, number of channels or other characteristics. Each representation consists of one or multiple segments. The attributes of a representation element, such as @id, @bandwidth, @qualityRanking, and @dependencyId are used to specify the properties of the associated representation.

Representations may also include sub-representations. sub-representations are embedded in regular representations and are described by the Sub-Representation element. For example, if a representation contains both audio and video, it may have a sub-representation to give additional information which only applies to the audio. Sub-representations may also provide information used to extract one stream from a multiplexed container or to extract a lower quality version of a stream, such as a version containing only I-frames, which is useful in fast-forward mode.

A segment is the largest unit of data that can be retrieved with a single HTTP request. Each segment has a URL, identifying an addressable location on a server, which can be downloaded using HTTP GET or HTTP GET with byte ranges.

To use this data model, the DASH client parses the MPD XML document, selects a collection of adaptation sets suitable for its environment based on information provided in each of the AdaptationSet elements. Within each adaptation set, the client selects one representation, typically based on the value of the @bandwidth attribute, but also taking into account client decoding and rendering capabilities. The client downloads the initialization segment of the selected representations and then accesses the content by requesting entire segments or byte ranges of segments. Once the presentation has started, the client continues consuming the media content by continuously requesting media segments or parts of media segments and playing content according to the media presentation timeline. The client may switch representations taking into account updated information from its environment. The client should play the content continuously across periods. Once the client is consuming media contained in the segments towards the end of the announced media in the representation, then either the media presentation is terminated, a new period is started, or the MPD is re-fetched.

Omnidirectional Media Format and Viewport Dependent Adaptive Streaming

Omnidirectional Media Format (OMAF) is a system standard developed by MPEG that defines a media format that enables omnidirectional media applications and focuses mainly on 360° video, image, audio and associated timed text. The Final Draft of International Standard (FDIS) of OMAF, described in ISO/IEC JTC1/SC29/WG11 N17399 "FDIS 23090-2 Omnidirectional Media Format", February 2018, was released early 2018.

The following are described in the OMAF standard.

A sub-picture is the picture that represents a spatial subset of the original content.

A sub-picture bitstream is the bitstream representing a spatial subset of the original content.

Viewing orientation is triple of azimuth, elevation, and tilt angle characterizing the orientation that a user is consuming the audio-visual content.

A viewport is the region of the omnidirectional image or video suitable for display and viewing by the user.

A viewpoint is the center point of a viewport or the point from which the user views the scene, it usually corresponds to a camera position.

A track is a collection of related samples in an ISO base media file. For media data, a track corresponds to a sequence of images or sampled audio.

Content coverage is one or more sphere regions that are covered by the content represented by the track or by an image item.

A quality ranking region is a region that is associated with a quality ranking value and is specified relative to a decoded picture or a sphere.

Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region is approximately constant. At most one region-wise quality ranking (RWQR) descriptor may be present at the DASH Adaptation Set level, and at most one RWQR descriptor may be present at the DASH Representation level.

The first version of OMAF specifies two profiles: the viewport-independent baseline presentation profile and the viewport-dependent baseline presentation profile.

For viewport-independent streaming, the 360 video pictures are encoded as a single bitstream. The entire coded bitstream is stored at a server, and if needed, typically fully transmitted to the OMAF player, fully decoded by the decoder, and the area of the decoded picture corresponding to the current viewport is rendered to the user.

For viewport-dependent video streaming, two video processing approaches are described below: a region-wise quality ranked encoding approach and a sub-picture based approach.

Region-Wise Quality Ranked Encoding Approach

Figure 3:
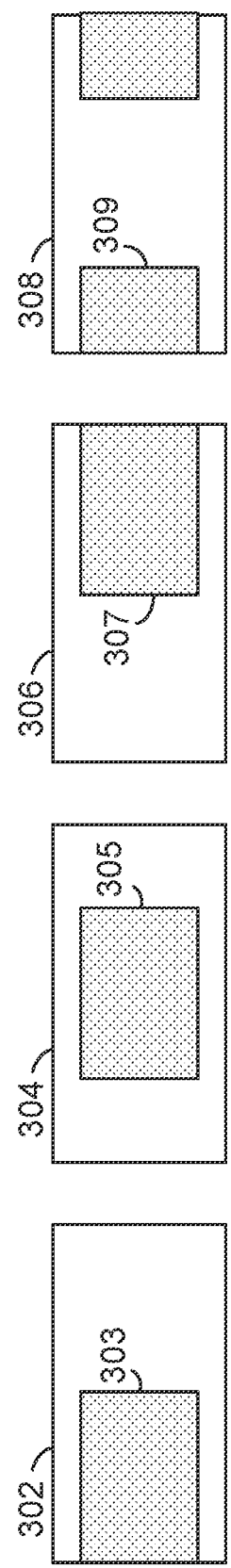
FIG. 3 illustrates an example of four tracks, each containing a 360 coverage equirectangular projection frame, but with different high quality encoded regions as shown by the rectangles with stippled filling.

The region-wise quality ranked encoding approach generates multiple independent streams, each stream containing the whole omnidirectional video, but each with a different high quality encoded region as indicated by region-wise quality ranking (RWQR) metadata. Depending on the current viewport, the stream that contains a high quality encoded region matching that of the current viewport location is selected and transmitted to the OMAF player. In the example given in FIG. 3, just one corresponding track is delivered, with the selection criteria based on the high quality encoded regions matching that of the user's current viewport. Initially, stream 302 is selected for transmission to the player. Stream 302 includes a higher-quality region 303. Subsequent streams 304, 306, 308, include respective higher-quality regions 305, 307, 309 that are intended to correspond to varying positions of he current viewport.

Figure 4:
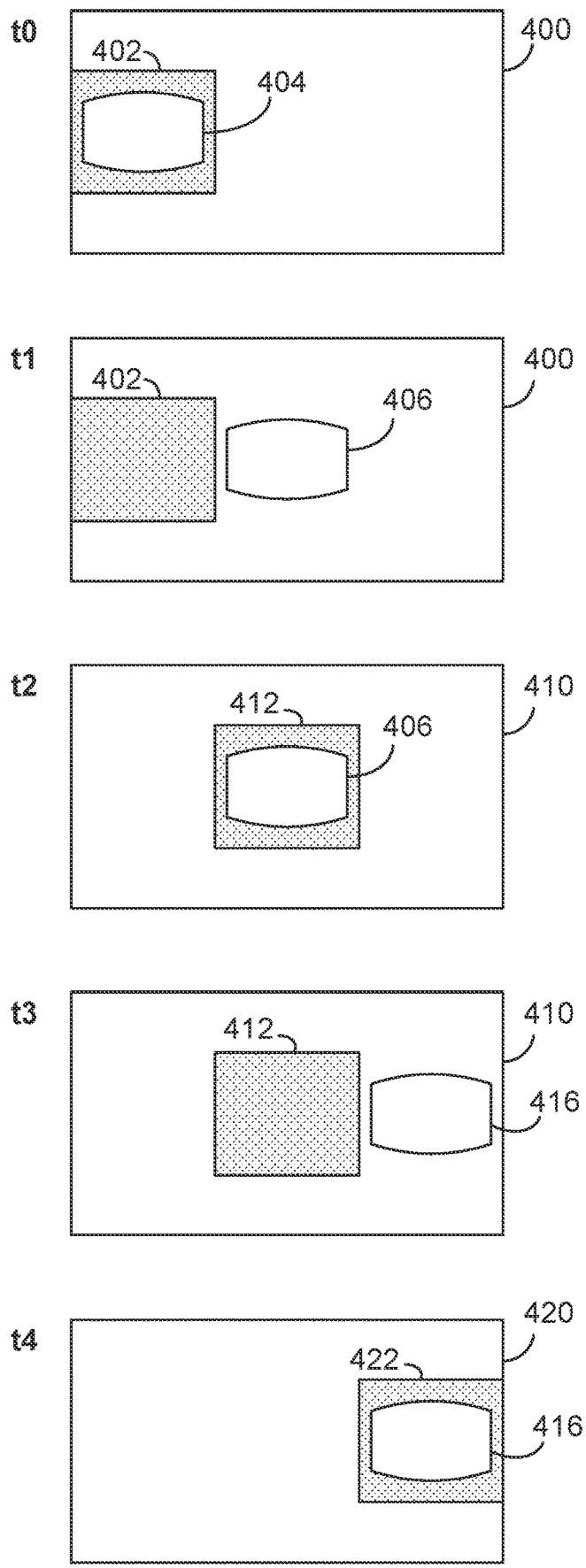
FIG. 4 illustrates a representation-based viewport switch example.

FIG. 4 shows such RWQR streaming example. In the example of FIG. 4, the player is rendering a first representation 400 (Representation #1) at time t0, where the high quality region 402 of representation 400 covers the first viewport 404. The first viewport 404 may switch to the second viewport 406 at time t1, and the player may keep rendering 400 (Representation #1) but start to request a new representation 410 (Representation #2) to obtain high quality coverage of the second viewport 406. At time t2, the newly requested representation 410 (Representation #2) is being rendered, and the second viewport 406 is rendered in high quality because the high-quality region 412 of representation 410 covers the viewport 406. The viewport may change to the third viewport 416 at time t3. A third representation 420 (Representation #3) with a high-quality region 422 is requested and later rendered at time t4.

In FIG. 4 and subsequent illustrations, regions and sub-pictures of an omnidirectional video are illustrated as being rectangular, while viewports are illustrated as having arc-shaped edges. These shapes have been selected for ease of comprehension, but it should be understood that regions, sub-pictures, and viewports may have different shapes in different embodiments.

Sub-Picture Based Approach

A sub-picture stream based approach splits the 360 video into sub-picture sequences. Each sub-picture sequence covers a subset of the spatial area of the omnidirectional video content. Each sub-picture sequence is then encoded independently from the others as a single bitstream. The OMAF player selects the sub-picture(s) to be streamed based on the orientation/viewport metadata of the OMAF player. Better quality or higher resolution stream are received, decoded and rendered for those sub-picture streams that correspond to the current viewport compared to the quality or resolution of those sub-picture streams that cover the remaining, currently non-rendered areas.

Figure 5B:
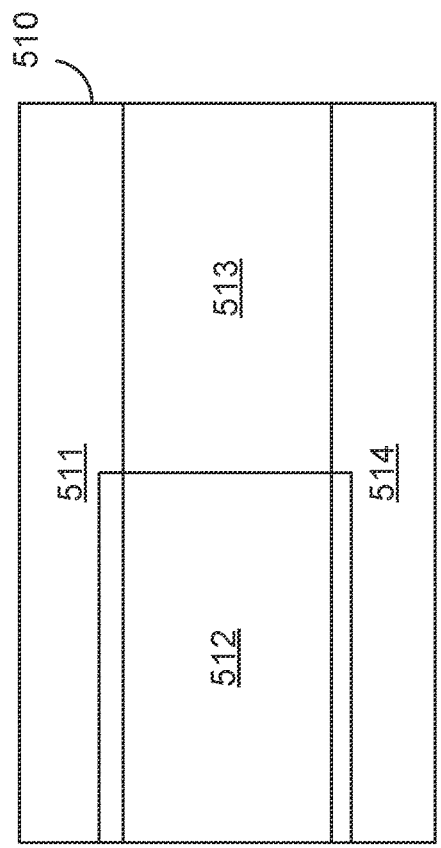
FIGS. 5A-5B illustrate examples of sub-pictures for a 360 video picture.
Figure 5A:
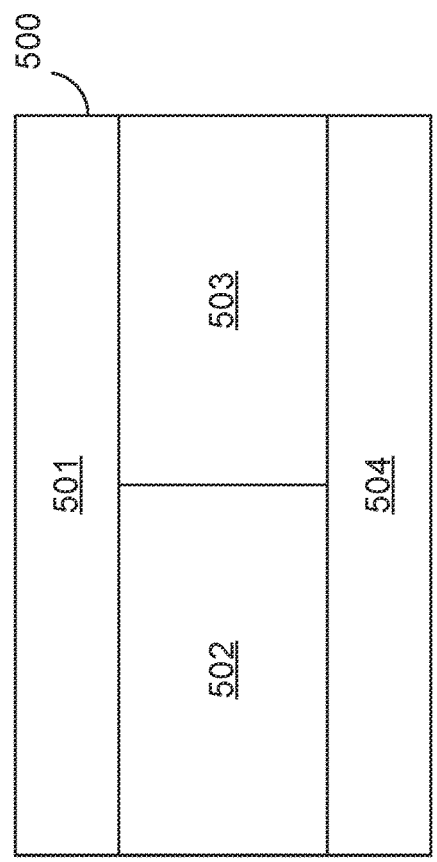

In the example given in FIGS. 5A-5B, the 360° video picture is split into four sub-pictures. FIG. 5A is the non-overlapping sub-picture example. In FIG. 5A, picture 500 is made up of non-overlapping sub-pictures 501, 502, 503, and 504. In FIG. 5B, picture 510 is made up of sub-pictures 511, 512, 513, and 514, but sub-picture 512 overlaps with both sub-picture 501 and sub-picture 514.

Figure 6:
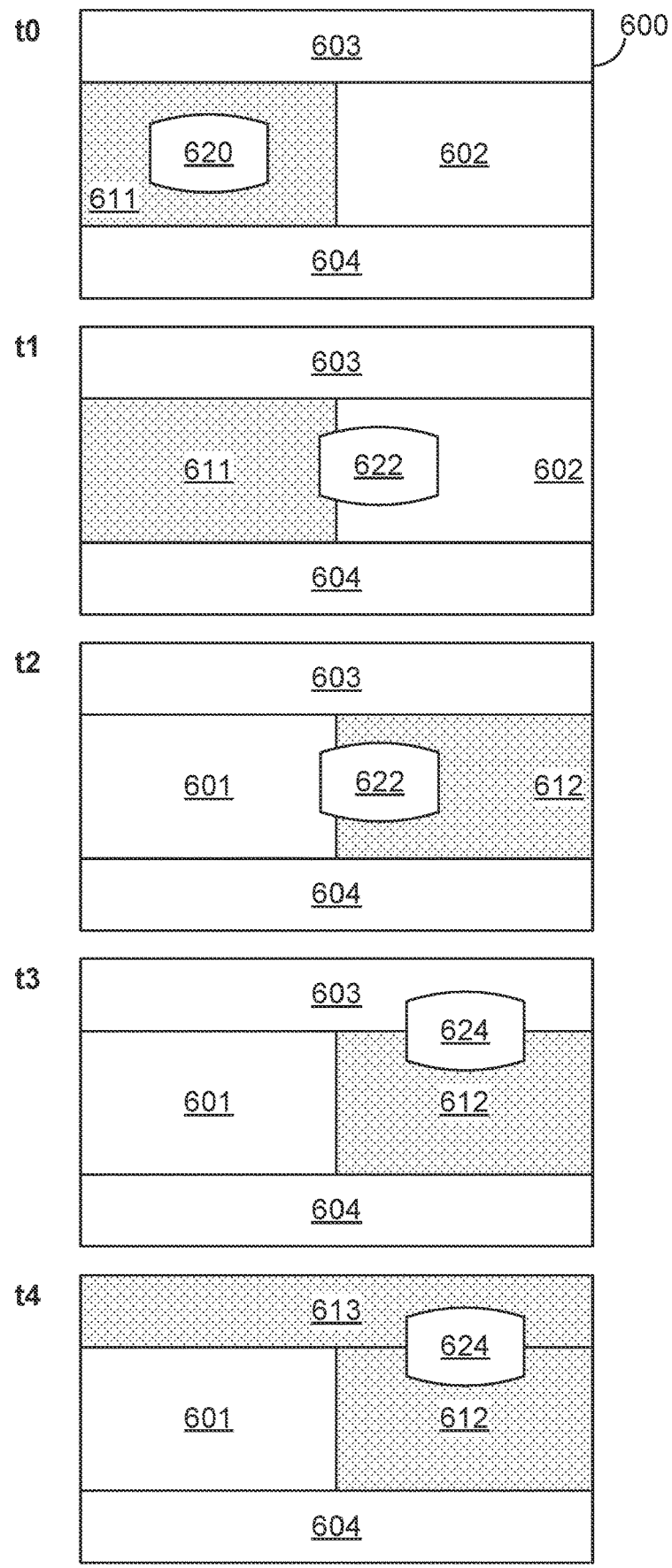
FIG. 6 illustrates a sub-picture based viewport switch example.

FIG. 6 shows an example of viewport switch and the corresponding sub-picture representation switch. The sub-pictures are not overlapped in the example of FIG. 6. In the example of FIG. 6, each sub-picture is encoded into two representations, with Representation H being the higher-quality representation (illustrated with stippled filling), and Representation L being the lower-quality representation.

In the example of FIG. 6, at time t0, the video picture 600 is made up of sub-pictures. At time t0. High-quality (indicated, for example, by RWQR value) representation 611 (which may be referred to as Rep(1,H)) is used to provide high-quality video to the viewport 620. Representations 602, 603, and 604 are outside the viewport 620 and are received in lower quality. The quality of representation 611 is higher than the quality of representations 602, 603, and 604 at time t0. As long as the viewport 620 remains within the sub-picture presented using representation 611, the player may continue to request and receive segments of high-quality representation 611 and low-quality representations 602, 603, and 604.

The representations requested (and rendered) by a player may change in response to a change in viewport position. In response to the viewport switching from the first viewport 620 to a second viewport 622 at time t1, initially, both high-quality representation 611 (Rep(1,H)) and low-quality representation 602 (Rep(2,L)) are rendered to present viewport 622. However, instead of continuing to request segments of high-quality representation 611, the player starts to request segments of a lower-quality version 601 (Rep(1,L)) of representation 611. Similarly, instead of continuing to request segments of low-quality representation 602, the player starts to request segments of a higher-quality version 612 (Rep(2,H)) of representation 602. Once these newly-requested segments are received, at time t2, viewport 622 is presented using representations 601 and 612 so that most of viewport 622 is rendered in high quality. The quality of viewport can be derived from the quality of the regions or representations being rendered to cover the viewport. At time t3, the viewport moves to viewport 624. Initially, viewport 624 is presented using high-quality representation 612 and low-quality representation 603. The player begins requesting a higher-quality version 613 of representation 603. Once that has been received, the viewport 624 is presented using high-quality representations 612 and 613.

Immersive Media Metrics

MPEG Immersive Media Metrics, described in ISO/IEC JTC1/SC29/WG11 N17400 "WD of ISO/IEC 23090-6 Immersive Media Metrics", February 2018, specifies a measurement framework and a collection of immersive media metrics for immersive applications to record and/or report their immersive media quality and client experience. A client reference model with observation and measurement points to define the interfaces for the collection of the metrics is also included in the working draft.

Figure 7:
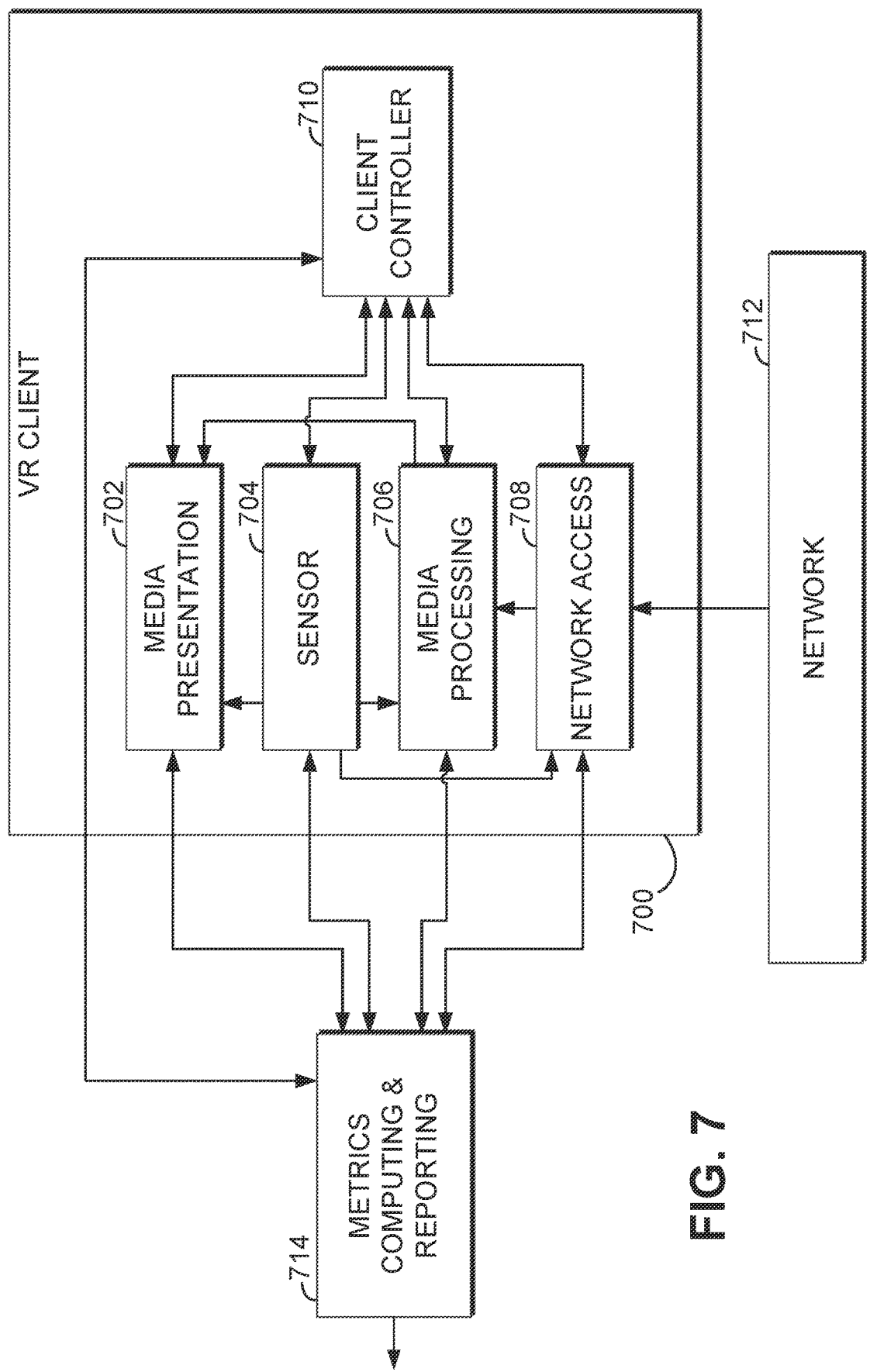
FIG. 7 illustrates an immersive media metrics client reference model.

FIG. 7 shows a client reference with five observation points. The metrics computing and reporting module may derive the metrics by aggregating the data from each OP. Several metrics candidates such as viewport switch latency, rendering FOV, etc. are described in the MPEG document, ISO/IEC JTC1/SC29/WG11 N17239, "Immersive Media Metrics Under Considerations", October 2017. FIG. 7 illustrates a VR client 700 that includes a media presentation module 702, a sensor module 704, a media processing module 706, a network access module 708, and a client controller 710. The media presentation module performs projection, composition, and rendering. The sensor module performs head, eye, and motion tracking and provides the sensor data to the media presentation module, the media processing module, and the network access module. The media processing module performs decapsulation, decoding, and parsing of media and metadata retrieved over a network 712 by the network access module. The modules of the VR client all communicate with a metrics computing and reporting (MCS) module 714, which compiles and reports on metrics such as those described herein.

Issues Addressed in Example Embodiments

Virtual reality (VR) provides opportunities for the user to naturally engage with the immersive experience, providing a sense of physical presence in the virtual environment. The impact and value of an immersive VR experience depend on VR devices, content production and VR technologies deployed. A consistent method to capture, measure and analyze such impact is useful for quantifying and assessing the VR product and application performance and effectiveness, enhancing feelings of presence and enjoyment, and further improving the product and experience design.

A few VR specific metrics have been proposed, e.g. in ISO/IEC JTC1/SC29/WG11 N17239, "Immersive Media Metrics Under Considerations", October 2017, and those metrics are application and technology agnostic. A lack of accurate and consistent metrics logging and reporting instrumentation may pose challenge for the industry to deliver a consistent set of metrics related to the overall quality of service and experience for the end user viewing the content.

For viewport-independent streaming applications, conventional video processing and distribution technologies can be deployed, and the user experience mainly depends on the network throughput, system end-to-end delay and device performance.

For viewport-dependent streaming applications, viewport-dependent coding and streaming technologies have been proposed to utilize the network bandwidth more efficiently. One goal of the viewport-dependent approach is to deliver a viewport portion of the omnidirectional video for display and viewing by the user in higher quality and the remaining area in lower quality. When the user changes the viewing orientation, the system updates the presentation to render the new viewport in higher quality quickly so that the user can experience the consistent higher quality video continuously. The viewport switch or transition latency affects the user experience, and technologies such as video coding, delivery, sensor tracking and rendering are contributing factors to that latency. To assess and optimize the system performance among all technology components, a feasible and consistent methodology to measure and analyze the performance of different technologies would be valuable for viewport-dependent service debugging, improvements and evaluation. It is desirable to develop a consistent methodology to support practical APIs and events driven measurement framework, so that the metrics can be used by the third party analytics for the quality of experience evaluation and verification.

Overview of Embodiments

There are at least two main categories of viewport-dependent video coding and streaming approaches.

The first approach is region-wise quality ranked (RWQR) encoding of omnidirectional content. Each Representation covers the whole 360° video frame but with a different high quality encoded region. Depending on the current viewport, the track that contains a high quality encoded region matching that of the current viewport location is selected based on the region-wise quality ranking metadata of the track and transmitted to the VR player.

The second approach is sub-picture based streaming, the source content is split into sub-picture sequences before encoding. Each sub-picture sequence covers a subset of the spatial area of the omnidirectional video content. It is possible that sub-pictures overlap. Each sub-picture sequence is then encoded independently from the others as a single bitstream. Further, to allow for rate adaption, several bitstreams may be encoded for one sub-picture sequence, e.g. for different bitrates, different resolutions, and the like. A player may request different multiple sub-picture tracks with different quality indicated by region-wise quality ranking metadata to render the viewport. A player may request the sub-picture tracks not covering the current viewport, and these tracks may be later decoded and rendered when the user's viewing orientation or viewport changes.

The viewing orientation change may be triggered, e.g., by user interaction on a conventional device with flat display, or by user's head movement on a head mounted device.

Representation Set

In the sub-picture based streaming approach, spherical regions are coded into a plurality of sub-picture streams. Each sub-picture may be encoded into multiple representations, each with different resolution, bitrate and/or quality. A goal is for better-quality representation streams are received to present the current viewport.

As used herein, the term "active viewport representation set" is used to refer to a set of representations being rendered to present a viewport.

As used herein, the term "viewport representation set" is used to refer to a set of the representations that belong to the same adaptation set(s) as the Representations in the active viewport representation set. In other words, a "viewport representation set" is a set of representations of the sub-pictures that are being rendered to present a viewport. The player may request the Representations or sub-Representations from the first viewport Representation set to render for the first viewport.

As an example, a first active viewport representation set includes one or more sub-picture representation and/or sub-representation streams covering a first viewport that is requested by the client in order to render content within the first viewport. The sub-picture representations and/or sub-representations covering the remaining area may or may not be requested, decoded or rendered by the player. When the viewing orientation of the user changes from a first viewport to a second viewport, the representations from the first active viewport representation set may not cover the full area of second viewport. The player then requests, decodes and renders representations from a second active viewport representation set which include one or more sub-picture representations and/or sub-representations covering the second viewport.

Figure 8:
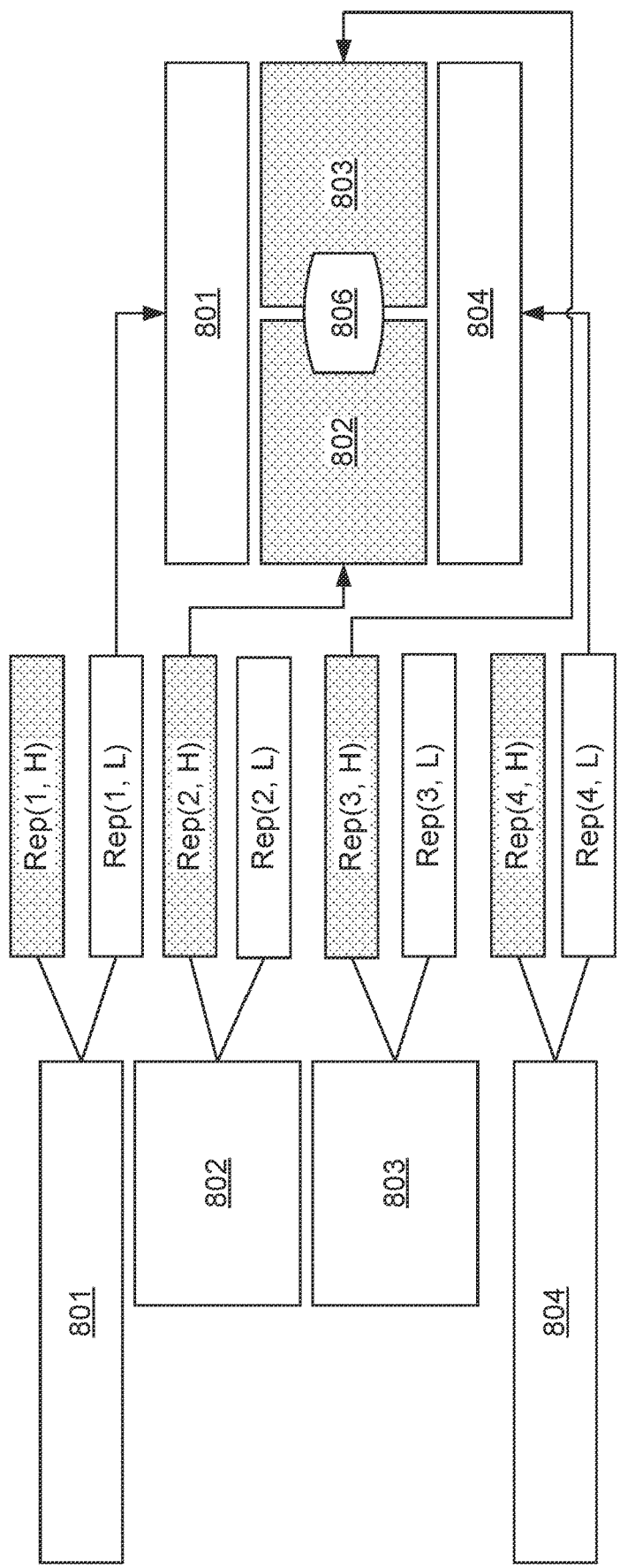
FIG. 8 illustrates an example of an active viewport representation set and a viewport representation set.

FIG. 8 shows an example of a viewport representation set. In the example of FIG. 8, each sub-picture is encoded into two representations, higher quality and lower quality, and both representations of the same sub-picture are included in the same adaptation set.

In the example of FIG. 8, Sub-picture #1 (801) has two Representations, Rep(1,H) and Rep(1,L); Sub-picture #2 (802) has two Representations, Rep(2,H), Rep(2,L); Sub-picture #3 (804) has two Representations, Rep(3,H), Rep(3,L); and Sub-picture #4 (804) has two Representations, Rep(4,H) and Rep(4,L).

When a viewport 806 covers both sub-picture #2 and #3 as shown in FIG. 8, the representations Rep(2,H) and Rep(3,H) are requested, decoded and rendered to present the viewport. In that case, representations Rep(2,H) and Rep(3,H) form the active viewport representation set. Representations Rep(2,H) and Rep(2,L) share the same adaptation set, and representation Rep(3,H) and Rep(3,L) share the same adaptation set. Therefore, Representations Rep(2,H), Rep(2,L), Rep(3,H) and Rep(3,L) form the viewport representation set.

Viewport Switch Event

VR delivers a sense of presence in a virtual world and allows the user to explore 360 degree surroundings. A VR application would ideally present the varying viewport instantaneously to match the user's viewing orientation and avoid perceptual conflicts, but in reality there is some amount of delay. Viewport switch-related metrics such as switching latency, tracking accuracy and quality consistency can be used to assess the viewing experience.

In systems using a single stream approach, the whole omnidirectional content is delivered in a segment and is decoded at the player side. The player renders a portion of the omnidirectional content and presents it as a viewport on the display. When the viewing orientation changes, the player presents another portion of the content directly to reflect the orientation changes. In this approach, the viewport switch latency is mainly caused by motion-to-photon latency.

The motion-to-photon latency is mainly determined by the factors such as display refresh rate, the content frame rate, rendering engine cycles and the sensor motion tracking performance. Table 1 provides a motion-to-photon latency metric that may be used in some embodiments. The motion-to-photon latency metric may include the measuring time and the latency logged.

TABLE 1

Motion-to-photon latency.

| Key | Type | Description |
| --- | --- | --- |
| MotionPhotonLatency | List | List of motion-to-photon latency during the playout. |
| Entry | Object | One motion-to-photon latency measurement. |
| t | Real-Time | Time of the measurement. |
| latency | Integer | Motion-to-photon latency in milliseconds. |

For sub-picture based viewport-dependent streaming, the player may request only the segments of the representations covering the viewport. When the user turns his or her head quickly to a new viewport that is not covered (entirely or partially) by the current segment, nothing in the new area could be seen before the segments covering the new viewport are requested, received, decoded and rendered. In another scenario, the player may request the segments of multiple representations to cover the whole omnidirectional content, and the player may decode and render only those segments covering the viewport. When the user turns his or her head quickly to a new viewport that is not covered (entirely or partially) by the segment currently being rendered, the player identifies the segments covering the new viewport and starts to decode and render those new segments to present the new viewport. In both scenarios, the viewport switch latency depends on factors such as network throughput, end-to-end system latency, sub-picture resolution, segment length and device decoding (e.g. single decoder vs. multiple decoders) and rendering capabilities. Methods to measure the viewport switch latency for the sub-picture based streaming approach are proposed here.

A viewport switch metric may be detected and measured based on the viewport switch event for sub-picture based viewport dependent streaming. In some embodiments, a viewport switch event from the first viewport to a second viewport is detected when a representation not included in the first viewport representation set is requested, and later decoded and rendered to present a second viewport.

Figure 9:
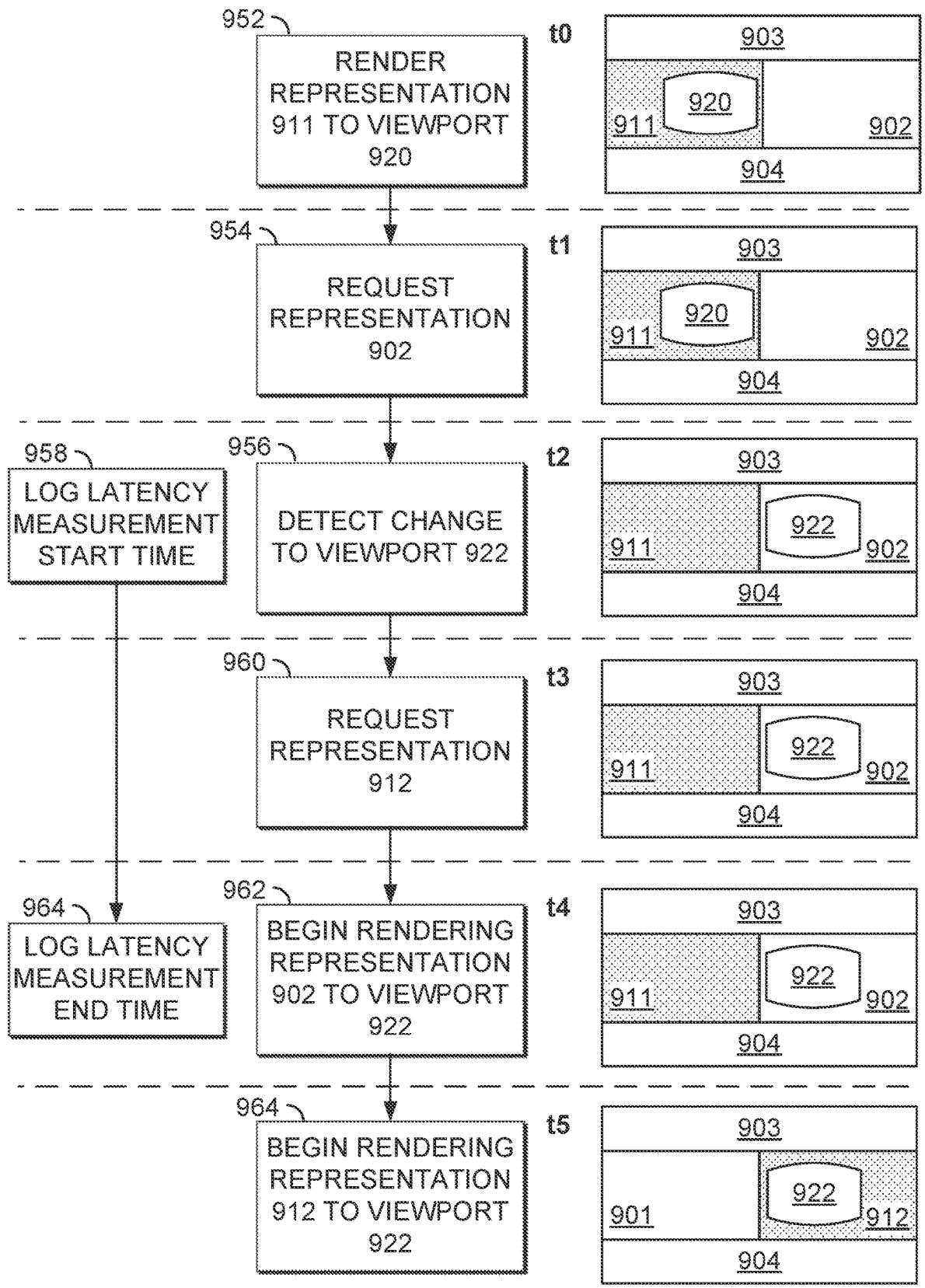
FIG. 9 illustrates a sub-picture based viewport switch example.

In examples described herein, expressions of the form Rep(i, j) are used to denote the j-th representation of the i-th sub-picture. FIG. 9 shows an example of detecting a viewport switch event based on representation switch.

In the example of FIG. 9, in step 952, at time t0, higher-quality representation Rep(1, H) (911) is being rendered to present the first viewport. The first active viewport representation set includes Rep(1,H) (911), and the first viewport representation set includes Rep(1,H) (911) and Rep(1,L) (901) that belong to sub-picture #1. Only Rep(1,H) (911) is being requested, decoded and rendered by the player. The player may also request (in step 954) other sub-picture Representations such as Rep(2,L) (902), Rep(3, L) (903) and Rep(4,L) (904) to cover the remaining areas on the sphere when presenting the first viewport, which lies entirely within the first sub-picture.

At time t2, in step 956, the sensor detects a change to the viewing orientation located at the second viewport 922. In step 958, in response to detecting the change to the second viewport 922, the player logs time t2 as a start time for a latency measurement. In step 960, at time t3, the player requests a higher-quality representation Rep(2,H) (912) of sub-picture #2. In step 962, at time t4, the player starts to render representation Rep(2, L) (902) that was not included in the first viewport representation set. (The order of steps 960 and 962 may be reversed.) The second active viewport representation set includes Rep(2,L), and the second viewport representation set includes Rep(2, H) and Rep(2, L) that belong to sub-picture #2 and share the same adaptation set. In response to the initiation in step 962 of rendering of Rep(2, L) (902), the player in step 964 logs time t4 as a latency measurement end time. The latency measurement generated using the technique of FIG. 9 may thus be calculated as a difference between start time t2 and end time t4. In step 964, at time t5, the higher-quality representation of sub-picture #2, Rep(2, H) (912), which was requested in step 960, is rendered.

The viewport switch latency in this example is measured as the time, e.g., in milliseconds, between the time of sensor detection of the user's viewing orientation at the second viewport, which results in a new representation or sub-representation that is not included in the first representation set being requested and rendered to present the second viewport, and the time at which the representation(s) covering second viewport content are fully rendered. In the example of FIG. 9, the viewport latency is the time interval between t2 and t4.

Figure 10:
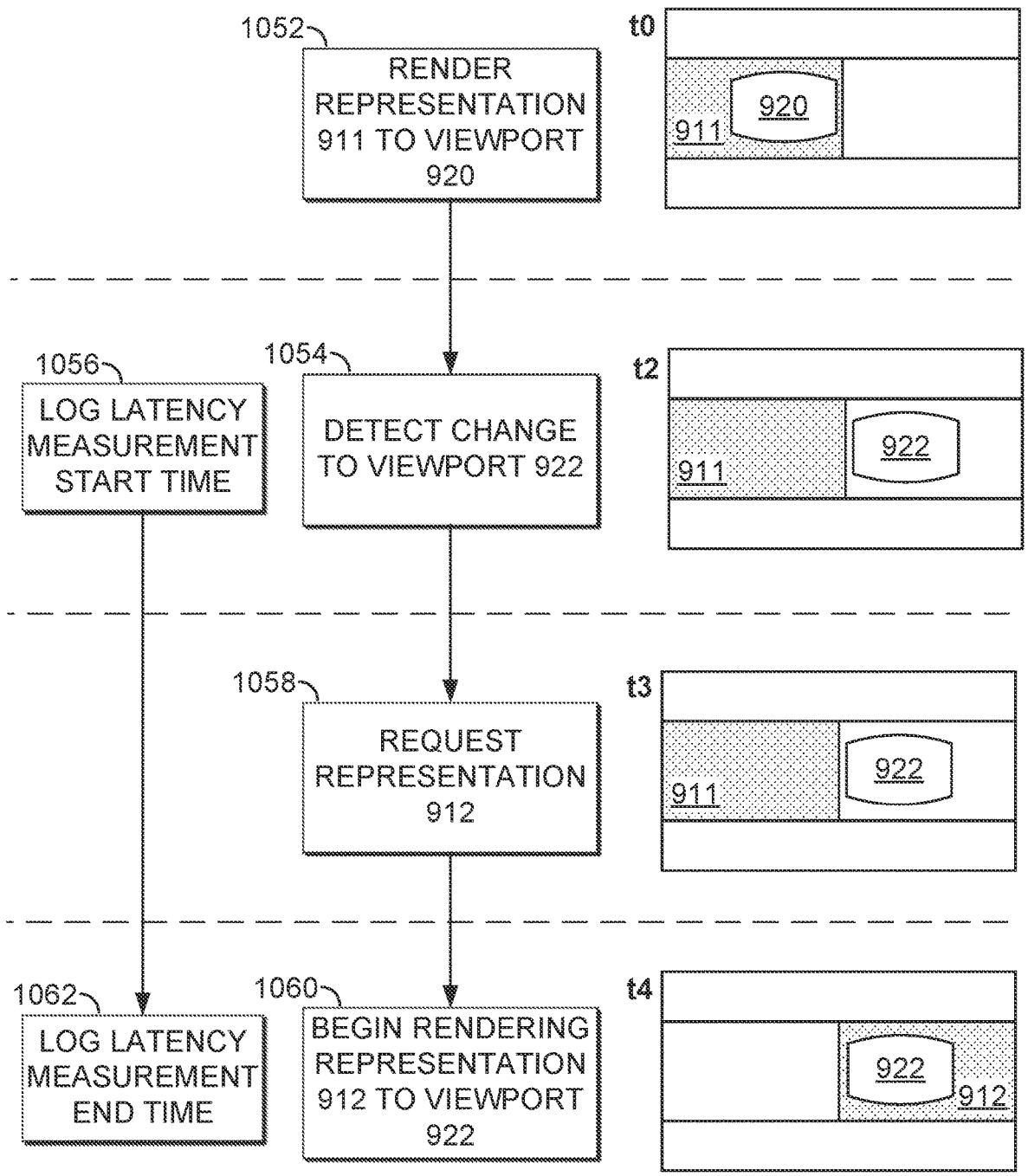
FIG. 10 illustrates another sub-picture based viewport switch example.

FIG. 10 shows another example of the viewport switch for a case in which the player only requests the representation segments covering the viewport.

In the example of FIG. 10, at time t0, the viewport 920 is positioned entirely within the region covered by representation 911. As a result, the viewer retrieves only representation 911, and in step 1052, the viewer renders representation 911 to the viewport 920. At time t2, in step 1054, the player detects a change to viewport 922. In response to the change in viewport, in step 1056, t2 is logged as a latency measurement start time. In step 1058, at time t3, the player requests representation 912, which covers the new viewport position 922. The player receives representation 912, and in step 1060, at time t4, the player begins rendering representation 912 to the viewport 922. In response to the initiation of rendering representation 912 to the viewport 922, time t4 is logged by the player in step 1062 as a latency measurement end time. The latency measurement generated using the technique of FIG. 10 may thus be calculated as a difference between start time t2 and end time t4. The viewport switching latency of FIG. 10 is in general higher than the viewport switching latency in FIG. 9 because in FIG. 10, the segment Rep(2,H) (922) covering the second viewport is not requested until after the sensor has detected the viewing orientation change.

Table 2 provides a viewport latency metric, including the parameters such as the time when the sensor detects the orientation change, the time when player issues a HTTP request for a new Representation, the time a new Representation is rendered to present new viewport and the total viewport switch latency.

TABLE 2

Viewport switch latency.

| Key | Type | Description |
| --- | --- | --- |
| ViewportSwitchingLatency | List | List of viewport switching latency measurements during playout. |
| Entry | Object | One viewport switching latency measurement. |
| sensorDetectionTime | Real-Time | Time when the sensor detecting the orientation change. |

TABLE 2-continued

Viewport switch latency.

| Key | Type | Description |
| --- | --- | --- |
| HTTPRequestingTime | Real-Time | Time when the player sends an HTTP request for a new Representation segment |
| viewportRenderingTime | Real-Time | Time when the new viewport is rendered |
| latency | Integer | Viewport switching latency in milliseconds. |

Viewpoint Switching Latency

A viewpoint is the point from which the user views the scene. A viewpoint often corresponds to a camera position. The viewpoint can be statically or dynamically positioned along the timeline. A real viewpoint may correspond to a camera's position when the video was captured, and virtual viewpoints may be generated via view synthesis methods. An event such as sport match or music concert may have multiple viewpoints on the field or stadium to offer different viewing perspectives to the users. The user may request one viewpoint at a time and switch among viewpoints on the fly. Viewpoint switching latency may be caused by a variety of factors, such as the device's response time, random access period at which video was encoded, rendering of viewpoint transition effects, and the time it takes to generate virtual viewports using view synthesis processes.

Table 3 provides an example of a viewpoint switching latency metric.

TABLE 3

Viewpoint switch latency.

| Key | Type | Description |
| --- | --- | --- |
| ViewpointSwitchingLatency | List | List of viewpoint switching latencies. |
| Entry | Object | |
| firstViewpoint | ViewpointDataType | Specifies the position or ID of the first viewpoint (before the switching) |
| secondViewpoint | ViewpointDataType | Specifies the position or ID of the second viewpoint (after the switching) |
| measurementTime | Real-Time | Specifies the measurement time of the viewpoint switching latency in wall-clock time. |
| latency | Integer | Specifies the delay in milliseconds between the time a user movement from first viewpoint toward second viewpoint is selected and the time when content corresponding to the second viewpoint is reflected on the display. |

The ViewpointDataType specifies the viewpoint identifier, label and viewpoint's position. Table 4 shows an example of a ViewpointDataType structure to be used in VR metrics.

TABLE 4

ViewpointDataType

| Key | Type | Description |
| --- | --- | --- |
| ViewpointDataType | Object | |
| Viewpoint_id | Integer | Specifies the unqiue identifier of the viewpoint. |
| viewpoint_label | String | Is a null-terminated UTF-8 string specifying a human readable text. |
| x | Integer | Specifies the X coordinate of the viewpoint position, in units of millimeters, in 3D space with (0, 0, 0) as the center of the common reference coordinate system. |
| y | Integer | Specifies the Y coordinate of the viewpoint position, in units of millimeters, in 3D space with (0, 0, 0) as the center of the common reference coordinate system. |
| z | Integer | Specifies the Z coordinate of the viewpoint position, in units of millimeters, in 3D space with (0, 0, 0) as the center of the common reference coordinate system. |
| longitude | Integer | Specifies the longitude coordinates of the geolocation of the viewpoint. |
| latitude | Integer | Specifies the latitude coordinates of the geolocation of the viewpoint. |
| altitude | Integer | Specifies the altitude coordinates of the geolocation of the viewpoint. |

In an embodiment, the viewpoint switching event starts when the sensor detects the user's selection of a second viewpoint while content of the first viewpoint is being rendered. The user may request one or multiple segments of the second viewpoint based on the default orientation of that viewpoint or an orientation that user selects. In case the second viewpoint is a virtual viewpoint, segments of the reference viewpoints' tracks may be requested to generate the new view. The display may render the transition between the first and the second viewpoint. The viewpoint switching event ends when the viewport of the second viewpoint is being rendered to the user.

In some embodiments, a potential viewpoint switch event is detected when a network request is made for a segment from a representation of a new viewpoint, whose representations are not currently being rendered, in response to an explicit user request or the user's interaction with the scene.

In the case of sub-picture-based viewport-dependent streams, one or more segments corresponding to sub-pictures of the new viewpoint may be requested. The event is finally identified (completed) when a viewport from the new viewpoint (not currently being rendered) is eventually rendered after the requested segment(s) are downloaded and decoded.

In some embodiments, in response to detection of a potential viewpoint switch, the client creates a record containing the detection time and the target viewpoint and adds this record to an in-memory data structure (e.g., a list) that keeps track of all pending viewpoint switching measurements. In response to the rendering module rendering a viewport with a new viewpoint id that is different from the viewpoint id of the preceding rendered viewport, the client checks the list of pending viewpoint-switching measurements for the record with the most recent detection time and a target viewpoint id equal to that of the viewport being rendered. If such a record exists, a viewpoint switching event is identified. The new viewport and its associated viewpoint id are assigned to the secondViewpoint field and the rendering time is assigned to the measurement time field measurementTime. All records with a detection time earlier than returned record are cleared from the list of pending viewpoint switch measurements. The viewport that was being rendered prior to the identified viewpoint switch event (and the associated viewpoint id) is then assigned to the firstViewpoint field. The viewport switching latency is calculated as the time interval between (i) the time at which a request was made for a representation of a new viewpoint and (ii) the time at which a representation of the viewpoint is rendered. The interval is assigned to the latency field and reported as the viewpoint switching latency.

The following timeline provides an example of the measurement process in the case of sub-picture-based viewport-dependent streaming:

Time t0: Client renders viewport from viewpoint A.

Time t1: One or more segments from viewpoint B are requested over the network in response to user interaction. Client creates a record <t1, B> indicating a pending viewpoint switching measurement and stores it in an in-memory data structure.

Time t2: Download of requested segment(s) is complete.

Time t3: Requested segments are decoded and viewport from viewpoint B is ready to be rendered.

Time t4: Sub-picture(s) for viewpoint B viewport are added to the active sub-picture set and viewpoint switching is identified. Client searches the in-memory data structure and retrieves <t1, B> (record with earliest start time and target viewpoint B). The last viewport being rendered before the viewpoint switch event was identified is assigned to firstViewpoint and new viewport from viewpoint B is assigned to secondViewpoint. Measurement time t4 is assigned to the field measurementTime. The time difference (t4−t1) is assigned to the latency field and reported as the viewpoint switching latency.

Service providers and device manufactures may use such a metric to evaluate the user experience and the system performance. For intermediate viewpoints or virtual viewpoint, such a metric may be used to characterize the performance of the view synthesis algorithm and of the device processing capability.

Rendered Viewpoints

In some embodiments, a rendered viewpoints metric reports a list of viewpoints that have been rendered at particular intervals of media presentation times. An example of a rendered viewpoints metric is specified in Table 5.

TABLE 5

Rendered viewpoints metric.

| Key | Type | Description |
| --- | --- | --- |
| RenderedViewpoints Entry | List Object | List of rendered viewports |
| startTime | Media-Time | Specifies the media presentation time of the first played out media sample when a viewport of the viewpoint indicated in the current entry is rendered starting from this media sample. |
| duration | Integer | The time duration, in units of milliseconds, of the continuously presented media samples when a viewport associated with the viewpoint indicated in the current entry is rendered starting from the media sample indicated by startTime. "Continuously presented" in this example refers to a period during which the media clock continued to advance at the playout speed throughout the interval. |
| viewpoint | ViewpointDataType | Indicates the position and rotation viewport that is rendered starting from the media sample indicated by startTime. |

The end user may switch among multiple viewpoints on-the-fly, the key startTime and duration indicate the specific part of entire content generated from a viewpoint is being rendered by the end user. The server may aggregate such a metric from multiple end users and derive the statistics of the usage of certain viewpoint and the attraction of the different part of the content from a viewpoint.

In another embodiment, the viewpoint information may be added to the Rendered Viewports metrics specified in ISO/IEC JTC1/SC29/WG11 N17564, "WD of ISO/IEC 23090-6 Immersive Media Metrics", April, 2018. Table 6 shows an example of a RenderedViewports metric with associated viewpoint information.

TABLE 6

Proposed Rendered Viewports metric.

| Key | Type | Description |
| --- | --- | --- |
| RenderedViewports Entry | List Object | List of rendered viewports |
| startTime | Media-Time | Specifies the media presentation time of the first played out media sample when the viewport indicated in the current entry is rendered starting from this media sample. |
| duration | Integer | The time duration, in units of milliseconds, of the continuously presented media samples when the viewport indicated in the current entry is rendered starting from the media sample indicated by startTime. "Continuously presented" refers to a period during which the media clock continued to advance at the playout speed throughout the interval. |
| viewport | ViewportDataType | Indicates the region of the omnidirectional media corresponding to the viewport that is rendered starting from the media sample indicated by startTime. |
| viewpoint | ViewpointDataType | Specifies the viewpoint associated with the viewport indicated in the current entry. |

Content producers may use a rendered viewpoints metric to identify the most viewed viewpoints and generate the recommended viewport of multiple viewpoints, or assign more resources on these viewpoints' content to improve the viewing experience, or add more physical or virtual viewpoints around the most popular viewpoint to offer more viewing perspectives to the users. For example, instead of synthesizing the intermediate view at the client side, a commonly-rendered virtual viewpoint may be synthesized at the server side for the user's request. Service providers may also rely on this metric to assign the segments of most rendered viewport content to the cache closer to the end user to improve the viewing experience.

Rendered Recommended Viewport

OMAF specifies the recommended viewport for a single viewpoint or multiple viewpoints. The recommended viewport timed metadata track indicates the viewport that should be displayed when the user does not have control of the viewing orientation or has released control of the viewing orientation. The recommended viewport type may be based on director's cut or based on measurement statistics. During the playback, the user may choose to release control of the viewing orientation and follow a recommended viewport timed metadata track, or switch from one recommended viewport track to another recommended viewport track. The user may take control of the viewing orientation back on-the-fly.

In some embodiments, a rendered recommended viewport metric is used to evaluate when the user switches to a recommended viewport timed metadata track and how long the user watches the corresponding recommended viewport track. The client device may log an event whenever the user does not have control of the viewing orientation or release control of the viewing orientation. The rendered recommended viewport metric may also be used to determine the popularity of the recommended viewport track and the popularity part of a recommended viewport track. Table 7 describes an example of a recommended viewport hit metric.

The metric may be logged every time the user switches to a recommended viewport timed metadata track.

TABLE 7

The recommended viewport hit metric.

| Key | Type | Description |
| --- | --- | --- |
| RenderedRecommendedViewport Entry | List Object | A list of recommended viewport hits. |
| id | Integer | The Representation id of the recommended viewport timed metadata track. |
| measurementTime | Real-Time | Specifies the measurement time of the Rendered Recommended Viewport in wall-clock time. |
| startTime | Media-Time | Specifies the media presentation time of the first played out media sample of the recommended viewport indicated in the current entry. |
| duration | Integer | The time duration, in units of milliseconds, of the continuously presented media samples of the recommended viewport. "Continuously presented" means that the media clock continued to advance at the playout speed throughout the interval. |

In the example of Table 7:
  id is the identifier of the recommended viewport timed metadata representation in the MPD;
  measurementTime specifies the wall-clock time at which the metric was measured when the user switches to a recommended viewport timed metadata track;
  startTime specifies the media presentation time of the first played out media sample of the recommended viewport sample; and
  duration specifies the duration of continuous rendering of the recommended viewport being measured.

The device may log the measurementTime to report when the measurement is carried out. The startTime and duration may be used to determine the specific part of the recommended viewport track that is interesting to the user. The id points to the specific recommended viewport timed metadata track which includes the information such as viewport region and the associated viewpoint position.

Content providers and service providers may use such metric to identify which recommended viewport track and which part of such track is appealing to the end user. The most rendered recommended viewport track or most rendered segments of the recommended track may be cached closer to the end users, while the least rendered recommended viewport track may be removed from the MPD file. Combining with the user profile, the analytic server may identify the viewing habits of different group of people based on the region, age, gender and content. The device manufactures may use such metric to assess whether its UI design can encourage user to follow the viewing recommendation easily.

Sub-Picture Set

The term active sub-picture set is used herein to refer to a group of sub-pictures that are being rendered to present the viewport. An active sub-picture set includes all representations of those sub-pictures being rendered to present the viewport.

The sub-pictures of the first active sub-picture set are rendered to present the first viewport, and the viewport switch event may be identified when at least one new sub-picture that is not included in the first active sub-picture set is rendered to present a second viewport.

Figure 11:
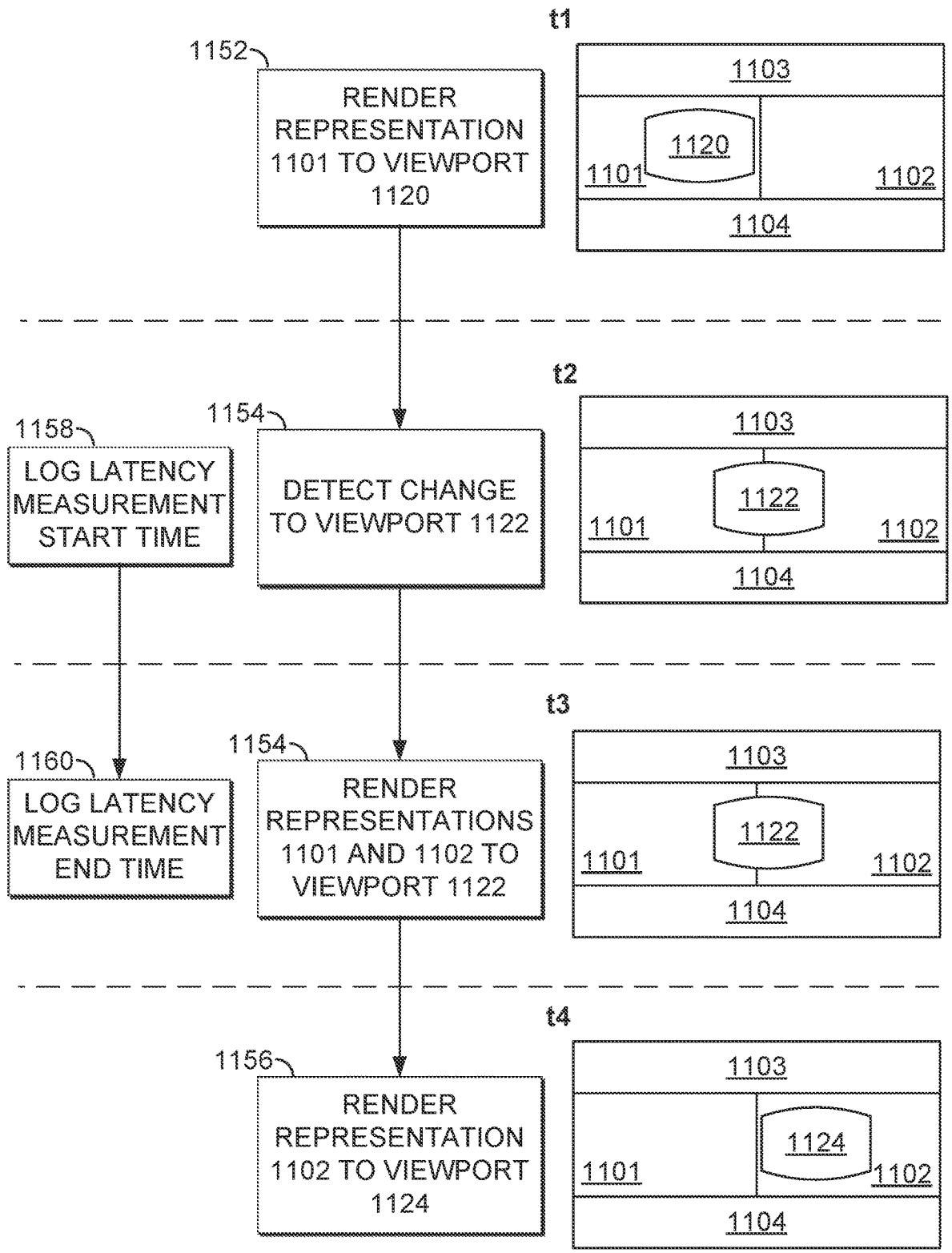
FIG. 11 illustrates an active sub-picture set example.

FIG. 11 illustrates an example using an active sub-picture set. When the sub-picture #1 (1101) is rendered in step 1152 to cover the first viewport 1120 at time t1, the first active sub-picture set includes the sub-picture #1 (1101). When the sensor detects in step 1154 that the viewing orientation has moved to the second viewport 1122 at time t2, the player starts to request the sub-picture #2 (1102). Both sub-picture #1 and #2 are rendered in step 1154 at time t3 to cover the second viewport 1102. As a result, the active sub-picture set at time t3 includes both sub-picture #1 (1101) and #2 (1102). When the user orientation moves to the third viewport 1124, only sub-picture #2 (1102) is rendered in step 1156 to cover the third viewport at time t4. As a result, at time t4, the third active sub-picture set includes only one sub-picture, sub-picture #2 (1102). The viewport switch latency may be measured as the time interval between time t2 (logged at step 1158) and t3 (logged at step 1160).

Comparable-Quality Viewport Switch Event

One factor impacting the viewing experience is the consistency of viewport quality. For viewport-independent streaming, the quality of the whole omnidirectional content is approximately constant, and the quality of the varying viewport is also constant. For sub-picture based viewport dependent streaming, the comparable quality viewport switch starts when the sensor detects that the user's viewing orientation turns from a first viewport to a second viewport. When the first viewport is being presented, the user may request one or multiple representations to cover partial or full omnidirectional content. All the rendered representations partially or fully covering the area of the first viewport are referred to as the first active viewport representation set, and all the representations of the sub-picture(s) being rendered to present the first viewport are referred to as the first viewport representation set. The viewport representation set includes not only the representations of each sub-picture that are currently being rendered, but also any other representations of those same sub-pictures (e.g. higher- or lower-quality representations) that are not being rendered for the viewport. The region-wise quality ranking (RWQR) value of the j-th representation of the i-th sub-picture representation is denoted qr(i, j). The quality ranking value of the j-th representation of i-th sub-picture when rendering the first viewport is $qr_1(i, j)$. The quality ranking value of each representation may be different. The quality ranking value of the representation(s) being rendered to cover the first viewport may be lower than the quality ranking value of the representations not covering the first viewport.

FIG. 12 shows an example of the first viewport 1200 and the quality ranking value of each representation. In the example of FIG. 12, the first active viewport representation set is {Rep(2,H), Rep(3,H), Rep(6,H), Rep(7,H)} because those representations are currently being rendered to viewport 1200. The first viewport representation set includes all other representations of the sub-pictures that are in the active viewport representation set, e.g. {Rep(2,H), Rep(2,L), Rep(3,H), Rep(3,L) Rep(6,H), Rep(6,L), Rep(7,H), Rep(7,L)}.

The player may send HTTP requests for at least one representation that is not included in the first viewport representation set but is later rendered after the sensor detects the viewing orientation has changed to the second viewport. The representation(s) or sub-representations of sub-pictures rendering the second viewport forms the second active viewport representation set. The quality ranking value of j-th representation of the i-th sub-picture being requested when the second viewport is rendered is $qr_2(i, j)$. The quality ranking value of the representation(s) being rendered to cover the second viewport may be less than the quality ranking value of the representations not covering the second viewport.

FIG. 13 shows an example of the second viewport 1300 and the quality ranking value of each representation. In the example of FIG. 13, the second active viewport representation set is {Rep(5,H), Rep(6,H), Rep(9,H), Rep(10,H)} because those representations are currently being rendered to viewport 1300. The second viewport representation set includes all other representations of the sub-pictures that are in the active viewport representation set, e.g. {Rep(5,H), Rep(5,L), Rep(6,H), Rep(6,L) Rep(9,H), Rep(9,L), Rep(10, H), Rep(10,L)}.

The quality ranking value of the viewport can be derived from the quality ranking values of all representations covering the viewport. For example, the quality ranking value of first viewport in FIG. 12 can be derived from $qr_1(2, H)$, $qr_1(3, H)$, $qr_1(6, H)$ and $qr_1(7, H)$; and the quality ranking value of second viewport in FIG. 13 can be derived from $qr_2(5, H)$, $qr_2(6, H)$, $qr_2(9, H)$ and $qr_2(10, H)$. In some embodiments, the quality ranking value of the viewport may be derived as an average value, a maximum value, or a minimum value of the quality ranking values of all representations covering the viewport. In some embodiments, the quality ranking value of the viewport may be derived as a weighted average of the quality ranking value of each region, where the weights may correspond to (e.g. may be proportional to) the area size of the viewport being covered by each region.

In embodiments that employ a quality ranking, a higher quality ranking value corresponds to a lower viewport quality. In other embodiments, quality measurements may be employed in which a higher quality measurement corresponds to a higher viewport quality. In the present disclosure, comparisons between quality measurements are described with reference to the underlying image quality, such that a higher "quality measurement" corresponds to a higher image quality, regardless of whether the underlying metric is a metric that increases with increasing viewport quality or a metric that decreases with increasing viewport quality.

Viewport dependent streaming may present the second viewport in low quality during the viewport switching transition, as shown in FIG. 9. Ideally, the sensor would detect the user movement to the second viewport and the player would present the second viewport to the user instantaneously with the same quality to avoid motion sickness. However, in real-world implementations, the player may not send an HTTP request for the new high quality representation to cover the second viewport until the sensor detects the viewing orientation changes. Depending on different technologies, it takes time for the player to request a new high quality segment of the new representation, and it takes time to download requested segment and retrieve the corresponding segment from the buffer for decoding and rendering. All these time intervals contribute to the comparable quality viewport switching latency, and such latency may impact the viewing experience significantly. Methods to measure the comparable quality viewport switching latency for a viewport dependent streaming approach are proposed here.

Figure 14:
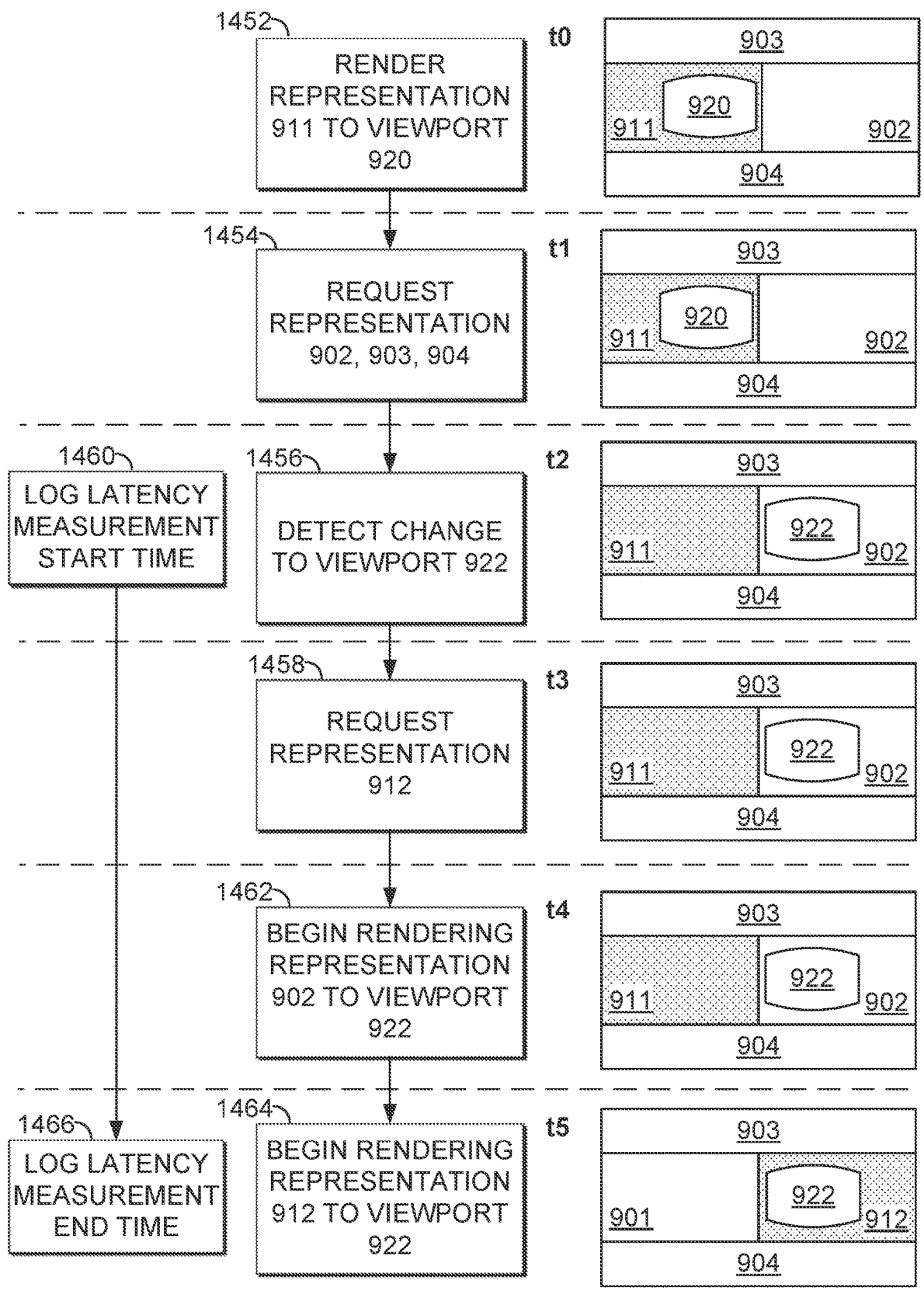
FIG. 14 illustrates a sub-picture based comparable quality viewport switch example.

In the example of FIG. 14, in step the player in step 1452 presents first viewport 911 at first quality (e.g. high quality) at time t0 with the representation from the first viewport representation set. The player may request representations not included in the first representation set (e.g. representations 902, 903, 904) at a second quality (e.g. low quality) in step 1454. The sensor detects the viewport change in step 1456 at time t2. In response to the viewport change, in step 1460, the player logs a latency measurement start time. In step 1458, the player sends first HTTP request for a new segment of Rep(2, H) (912) with third quality at time t3. At presentation time t4, the requested segment of Rep(2, H) with third quality may not be downloaded completely, or the previous segment of Rep(2, L) with second quality is in the buffer. The player in step 1462 renders the segment of Rep(2, L) (902) with second quality at time t4. The segment of Rep(2, L) with second quality may have been requested at time t1 before the viewport switch detection. The newly requested segment of Rep(2, H) with third quality is decoded and is rendered in step 1464 at time t5. In step 1466, time t5 is logged as a latency measurement end time.

The comparable quality viewport switch event may be determined when (i) a representation not included in the first viewport representation set is being rendered to present the second viewport and (ii) the quality of the second viewport is equal to or higher than the first quality associated with the first viewport. The time of such an event may be logged in step 1460.

In another embodiment, the comparable quality viewport switch event may be determined when (i) a representation not included in the first viewport Representation set is being rendered to present the second viewport and (ii) the quality associated with the second viewport is higher than the quality of the same viewport when the first viewport is presented. In other words, the quality of the second viewport after viewport switch shall be higher than the quality of the second viewport before the viewport switch. The latency between the time sensor detecting viewing orientation at second viewport (e.g. time t2), and the time when the second viewport is presented at comparable quality (e.g. t5), may be measured as the comparable-quality viewport switch latency.

Figure 15:
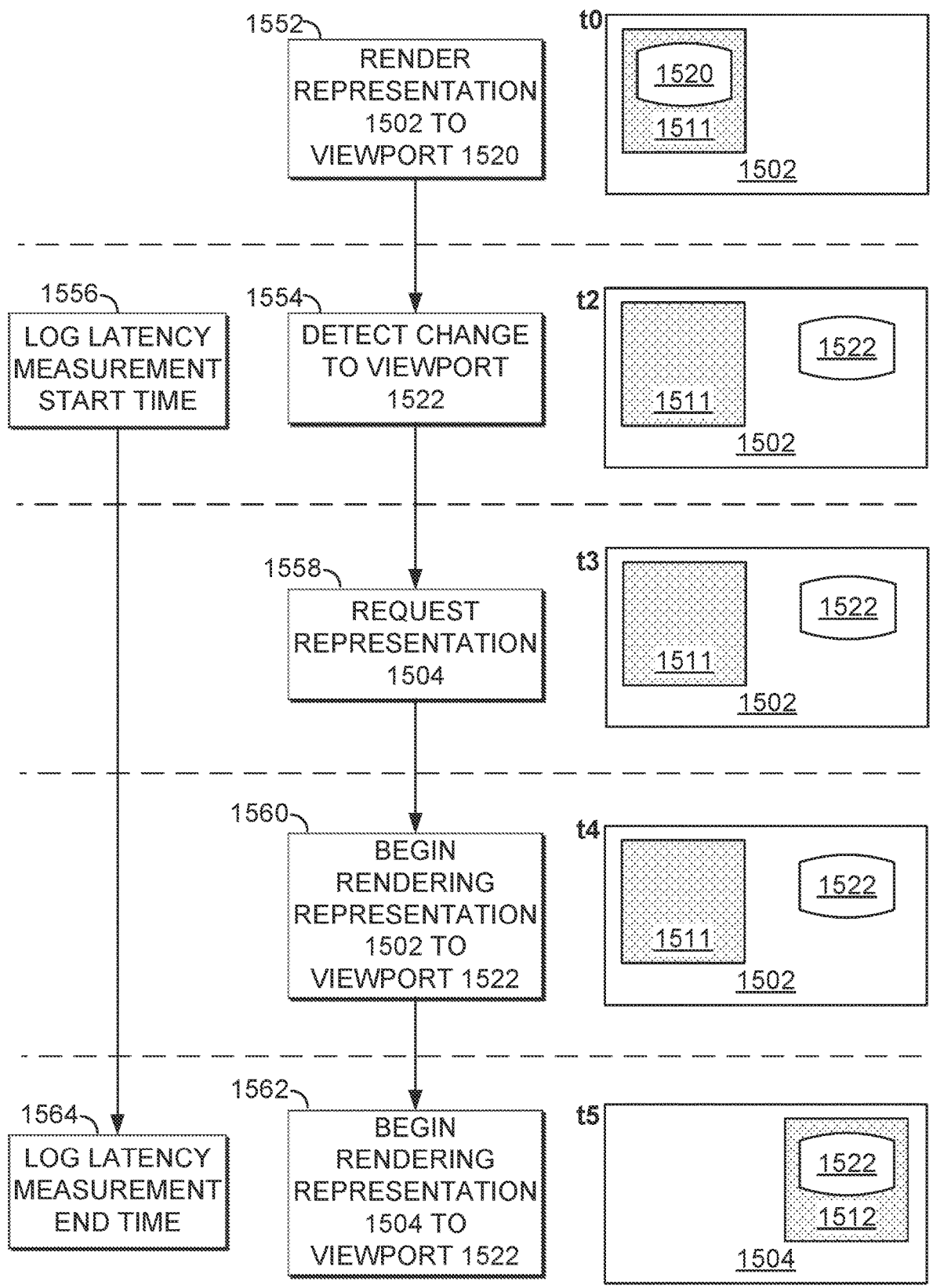
FIG. 15 illustrates a region-wise quality ranked encoding content comparable quality viewport switch example.

FIG. 15 illustrates a comparable-quality viewport switch example for region-wise quality ranked (RWQR) encoded omnidirectional content. Each representation covers the whole omnidirectional content, but with a different high quality encoded region as indicated by region-wise quality ranking metadata. In step 1552, when the player is presenting the first viewport 1520 at time t0, the representation 1502 that contains a high-quality encoded region 1511 matching that of the first viewport location (Rep#1) is requested, decoded and rendered based on the region-wise quality ranking metadata by the player. In step 1554, the player may detect the viewing orientation changes to the second viewport position 1522 at time t2. In response to the change of viewport position, time t2 is logged in step 1556 as a latency measurement start time. In step 1558, the player sends an HTTP request for a different RWQR representation 1504 (Rep#2) at time t3. Representation 1504 includes a high-quality encoded region 1512 that encompasses the second viewport position 1522. Rep#2 (1504) may not be ready at the presentation time t4 so the Rep#1 is decoded and low quality encoded region of representation 1502 is rendered in step 1560 to present the second viewport 1522. In step 1562, Rep#2 (1504) with a high-quality encoded region 1512 is rendered to the viewport 1522 at time t5. In response to rendering of the high-quality encoded region 1512 to the viewport 1522, time t5 is logged as a latency measurement end time in step 1564. The interval between t2 and t5 is measured as the comparable quality viewport switch latency and may be sent in a report to a metrics server.

For RWQR encoded content, representations with different high quality encoded regions may belong to the same adaptation set. In such cases, the comparable quality switch event specified for sub-picture scenario may not apply to RWQR encoded content.

For RWQR encoded content, a first representation with a first high quality encoded region is rendered to present the first viewport. The sensor may detect the user orientation change and request a second representation with a second high quality encoded region that is different from the first high quality encoded region. The comparable quality viewport switch may be identified when (i) a second representation with a second high quality encoded region is rendered, (ii) the second high quality encoded region is not the same as the first high quality encoded region, and (iii) the quality of the second viewport is comparable to the quality of the first viewport. The viewport quality may be derived from quality of encoded region(s) that cover the viewport which is indicated by the region-wise quality ranking value. In some embodiments, comparable quality is found when the quality of the second viewport is equal to or higher than the quality of the first viewport. In other embodiments, comparable quality is found when the quality of the second viewport is higher than the quality of the area covering the second viewport when the first viewport is presented.

Table 8 presents an example of a comparable quality viewport latency metric, including parameters such as the time when the sensor detects the orientation change, the time when player issues a HTTP request for a new representation, the time a new representation is rendered to present new viewport, the quality ranking value of both first viewport before the comparable quality viewport switch event, the quality ranking value of the second viewport after comparable quality viewport switch event, and the total comparable quality viewport switch latency.

TABLE 8

Comparable quality viewport switch latency.

| Key | Type | Description |
| --- | --- | --- |
| QualityViewportSwitchingLatency | List | List of viewport switching latency measurements during playout. |
| Entry | Object | One comparable quality viewport switching latency measurement. |
| sensorDetectionTime | Real-Time | Time when the sensor detecting the orientation change. |
| HTTPRequestingTime | Real-Time | Time when the player sends an HTTP request for a new representation segment. |
| viewportRenderingTime | Real-Time | Time when the new viewport is rendered. |
| firstViewportQualityRankingValue | Integer | The quality ranking value of the first viewport. |
| secondViewportQualityRankingValue | Integer | The quality ranking value of the second viewport. |
| latency | Integer | Viewport switching latency in milliseconds. |

In some embodiments, a viewport switching event is identified when a track or representation of one or more sub-pictures that do not belong to the current active sub-picture set are rendered. The viewport switching event time is assigned to viewportRenderingTime as shown in Table 8.

In some embodiments, the viewport switching time is the time at which the new sub-picture is rendered. Viewport quality may be logged (e.g. periodically), including in a time period before the viewport switching time. In some embodiments measurement of viewport switching latency makes use of two measurement time intervals to set a measurement range. A pre-switch interval value, M milliseconds where M is an integer, is a time period that stretches back in time before the viewport switching time. A post-switch interval value, N milliseconds where N is an integer, is a time period starting from the viewport switching time.

Various methods may be employed to specify the value of time interval M and N. Examples of such methods are the following.

M and N may be specified by a standard, and all clients shall use the commonly specified values when measuring and reporting the metric.

M and N may be determined by a network server and signaled to the client as metadata either signaled in an MPD or signaled using a DASH server and a network assisted DASH message.

M and N may be selected by the client and used internally to generate the reports. The value of M and N may be selected based on factors such as motion to photon latency, the orientation sensor detection latency, download and decoder buffer size, and field of view, etc.

If the client selects M and N for its own use in generating the reports, then the client may signal these values to the metrics server so that it understands how the reports were generated—e.g. values for M and N may be added to the reporting metadata.

In some embodiments, the client logs the viewport information, viewport quality and the wall clock time periodically. The logging period is smaller than the minimum value of M and N. The logging period may be smaller than a minimum latency defined set for the QualityViewportSwitchingLatency metric. The viewport quality value corresponding to the highest viewport quality being logged within the past M milliseconds before the viewport switching time is set as the firstViewportQualityRankingValue as shown in Table 8. If more than one measurement within the pre-switch interval has a viewport quality value equal to the maximum viewport quality value, the latest one of those measurements may be used as the selected pre-switch measurement time.

During a comparable-quality viewport switching latency measurement cycle, if the quality value of the new viewport cannot match firstViewportQualityRankingValue during the next N milliseconds after the viewport switching time, the measurement cycle is interrupted and the metric is not reported. The metric is also not reported if a new viewport switching event is detected before a comparable viewport quality can be identified after the viewport switching event.

In some embodiments, viewport qualities are deemed to be comparable if they provide subjectively equivalent or subjectively similar subjective viewing qualities. In some embodiments, a viewport quality is deemed to be comparable to a prior viewport quality if it is at least as high as the prior viewport quality. In some embodiments, a viewport quality is deemed to be comparable to a prior viewport quality if it is within a predetermined threshold (for example a predetermined percentage) of the prior viewport quality.

The quality value of the new viewport that is comparable to firstViewportQualityRankingValue is set as secondViewportQualityRankingValue.

The latency of QualityViewportSwitchingLatency is measured as the time interval between the logged time of the firstViewportQualityRankingValue and the post-switch measurement time at which secondViewportQualityRankingValue is measured.

Figure 16:
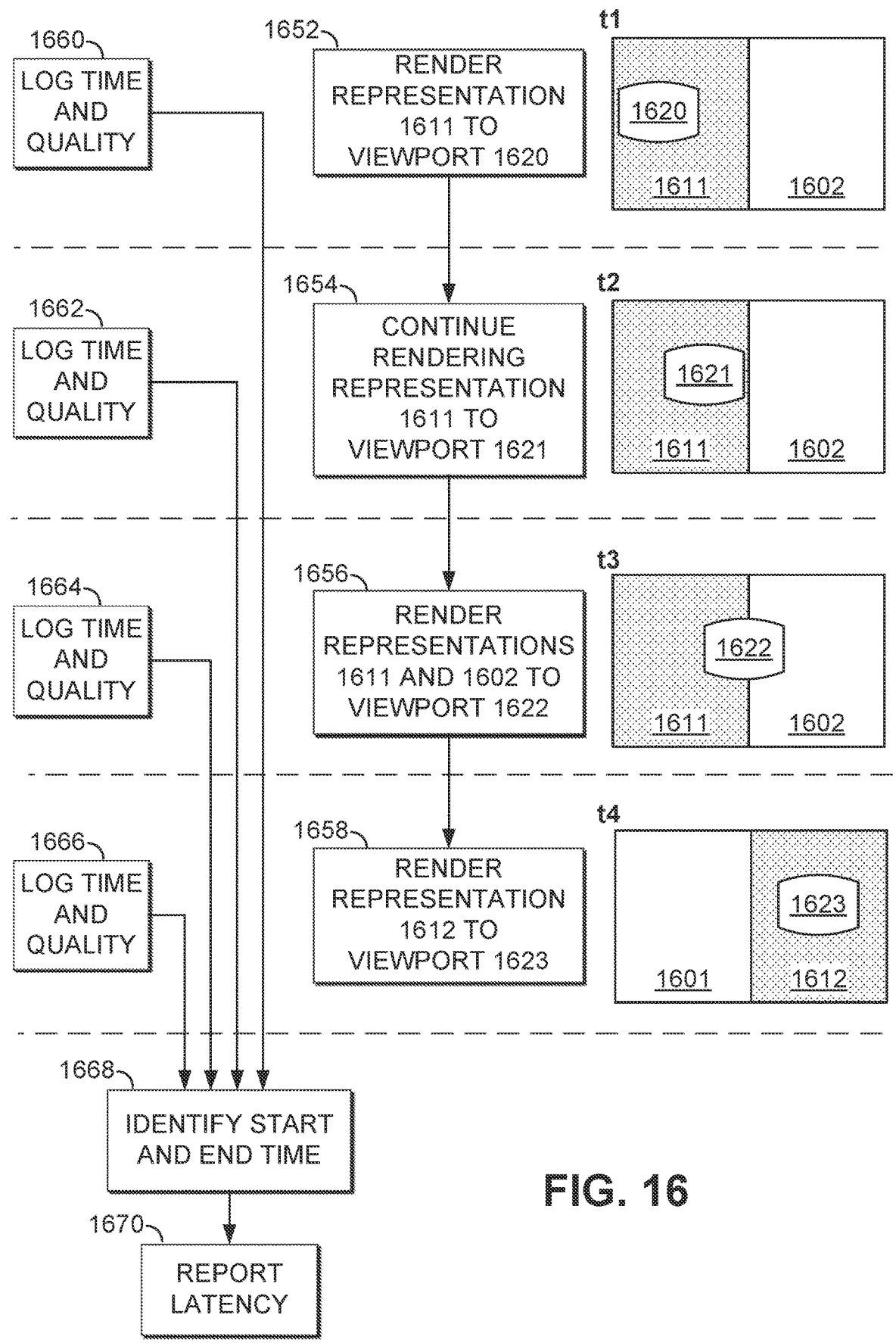
FIG. 16 shows an example of a measurement procedure using a pre-switch interval and a post-switch interval according to some embodiments.

FIG. 16 shows an example of a measurement procedure according to some embodiments. The user viewing orientation is moved from gradually from the left (e.g. viewport

1620 at time t1) to the right (e.g. viewport 1623 at time t4). In step 1652 at time t1, high-quality representation 1611 is rendered to viewport 1620.

At time t2, the viewport has moved to position 1621, but it is still within sub-picture #1, and in step 1654, the player continues to render representation 1611.

At time t3, the viewport has moved to position 1622, which spans both sub-picture #1 and su-picture #2. In step 1656, they player renders representations 1611 (a high-quality representation of sub-picture #1) and 1602 (a buffered low-quality representation of sub-picture #2) to viewport 1602. At time t3, the rendering module identifies the viewport switching event by detecting that a new sub-picture (sub-picture #2) has been added to the active sub-picture set.

At time t4, the viewport has moved to viewport position 1623, and a higher-quality representation 1612 of sub-picture #2 has been received and is being rendered to viewport 1623.

In the embodiment of FIG. 16, to determine a comparable-quality viewport switching latency, a plurality of viewport quality measurements and associated measurement times are logged. For example, time and quality measurements are logged at times t1 (step 1660), t2 (step 1662), t3 (step 1664), and t4 (step 1666). The player detects a viewport switch event at time t3 in response to the addition of sub-picture #2 to the active sub-picture set. In step 1668, the player selects the times to be used to calculate a latency measurement. Specifically, the player selects a pre-switch measurement time and a post-switch measurement time. The pre-switch measurement time and a post-switch measurement time may be determined as follows.

In some embodiments, the pre-switch measurement time is selected as the logged time that has both of the following criteria: (i) the selected pre-switch measurement time is within a predetermined pre-switch interval before the viewport switch event and (ii) the viewport quality measurement associated with the selected pre-switch measurement time is a maximum viewport quality measurement within the pre-switch interval. The length of the predetermined pre-switch interval may be represented by M, which may be expressed in milliseconds. If more than one pre-switch measurement time has the maximum quality measurement within the pre-switch interval, the last of these measurement times may be selected as the pre-switch measurement time. The pre-switch interval may include the time of the viewport switch event.

In some embodiments, the post-switch measurement time is selected as the logged time that has both of the following criteria: (i) the selected post-switch measurement time is within a predetermined post-switch interval after the viewport switch event and (ii) the selected post-switch measurement time has an associated viewport quality measurement at least as great as the maximum viewport quality measurement within the pre-switch interval. The length of the predetermined post-switch interval may be represented by N, which may be expressed in milliseconds. The selected post-switch measurement time may be the first measurement time in the post-switch interval to satisfy the above criteria. In some cases, no logged time satisfies the foregoing criteria. This will be the case if, for example the viewport quality does not reach pre-switch levels until after time N has passed. In such cases, the player may make a determination not to report any latency value. Similarly, if a second viewport switch event occurs before the viewport quality has reached pre-switch levels, the player may make a determination not to report any latency value.

A latency value may be calculated by subtracting the selected pre-switch measurement time from the selected post-switch measurement time to determine an interval between the selected pre-switch measurement time and the selected post-switch measurement time. In step 1670, the player reports the latency value to, for example, a metrics server.

In some embodiments, the viewport quality value associated with the highest viewport quality being logged within the past M milliseconds is set as firstViewportQualityRankingValue and the corresponding pre-switch measurement time is stored. A quality value for the new viewport that matches firstViewportQualityRankingValue is logged as a post-switch measurement time at time t4, and this value is assigned to secondViewportQualityRankingValue. The latency is reported as the time interval between the logged times for firstViewportQualityRankingValue and secondViewportQualityRankingValue.

FIGS. 17A and 17B are graphs that schematically represent viewport quality measurements. Each graphed point represents a logged viewport quality measurement and its associate measurement time.

In FIG. 17A, a viewport switch event is detected at time 1702. The viewport switch event may be detected in response to rendering of at least one sub-picture that was not previously being rendered. The time 1702 may or may not coincide with the time of any viewport quality measurement. A pre-switch interval extends M milliseconds before the viewport switch event. The pre-switch measurement time is selected to be the time of measurement 1704 because that measurement has the highest quality level in the pre-switch interval (which may be, e.g. the lowest "quality ranking"). The post-switch measurement time is selected to be the time of measurement 1706 because (i) that measurement is the first measurement to have a quality value at least as great as the quality value at measurement 1704, and (ii) it falls within a predetermined post-switch interval extending N milliseconds after the viewport switch event. The player may calculate a latency as the interval between measurements 1704 and 1706 and may report that latency to a server.

With reference to FIG. 17A, if a second viewport switch event were to be detected before the occurrence of an appropriate post-switch measurement, e.g. if a second viewport switch event were to be detected at time 1708, the player may make a determination not to report any latency for the viewport switch event of time 1702. However, the player in such circumstances may still take steps to determine a latency that for the viewport switch event of time 1708.

In FIG. 17B, a viewport switch event is detected at time 1712. The viewport switch event may be detected in response to rendering of at least one sub-picture that was not previously being rendered. A pre-switch interval extends M milliseconds before the viewport switch event. The pre-switch measurement time is selected to be the time of measurement 1714 because that measurement has the highest quality level in the pre-switch interval. However, no post-switch measurement satisfies the criteria of (i) having a quality value at least as great as the quality value at measurement 1714, and (ii) falling within a predetermined post-switch interval extending N milliseconds after the viewport switch event. Because no appropriate post-switch measurement was selected, no latency is reported to the server for the viewport switch event at time 1712.

Additional Embodiments

In some embodiments, a position of a viewport is tracked with respect to a 360-degree video, where the video includes a plurality of representations. A selected set of at least one of the representations is rendered to the viewport. Representations are adaptively added and removed from the selected set based on the viewport position. A viewport switching latency is measured, where the viewport switching latency represents a latency between a first time at which a change in viewport position triggers adding of a new representation to the selected set and a second time at which rendering of the new representation begins. The viewport switching latency may be reported, e.g. to a metrics server. Each representation may correspond to a respective region of the video, and the selected set may include at least a set of representations sufficient to cover the entire viewport.

In some embodiments, a method includes tracking a position of a viewport with respect to a 360-degree video, wherein the video comprises a plurality of representations. A selected set of at least one of the representations is rendered to the viewport. The representations in the selected set are actively changed based on the viewport position. A comparable-quality viewport switching latency is measured where the comparable-quality viewport switching latency represents a latency between a first time at which a change in viewport position triggers changing representations in the selected set and a second time at which a quality of the rendered viewport after the change in viewport position becomes at least as high as the quality of the rendered viewport before the change in viewport position.

In some embodiments, a method of rendering a 360-degree video is provided, wherein the video comprises a plurality of sub-picture representations, each sub-picture representation corresponding to a respective region of the video. At a first time, while a viewport is in a first position, at least a portion of each sub-picture representation in a first set of active representations is rendered, with each sub-picture representation in the active set overlapping at least a portion of the viewport. A second time is detected at which the viewport has moved to a second position in which at least a portion of the viewport does not overlap with any sub-picture representations in the first set of active viewport representations. At a third time after the second time, rendering begins of at least a portion of a new sub-picture representation that is not in the first set of viewport representations. A latency between the second time and the third time is calculated and reported.

In some embodiments, a method is provided of rendering a 360-degree video, wherein the video comprises a plurality of sub-picture representations, each sub-picture representation corresponding to a respective region of the video. At a first time, while a viewport is in a first position, at least a portion of each sub-picture representation in a first set of active representations is rendered, with each sub-picture representation in the active set overlapping at least a portion of the viewport. A first viewport quality is determined at the first time. A second time is detected at which the viewport has moved to a second position in which at least a portion of the viewport does not overlap with any sub-picture representations in the first set of active viewport representations. After the second time, at least a portion of a new sub-picture representation that is not in the first set of viewport representations is rendered. A third time is detected at which the viewport quality is comparable to the first viewport quality. A latency between the second time and the third time is calculated and reported. In some embodiments, detecting the third time at which the viewport quality is comparable to the first viewport quality comprises detecting when the viewport quality is equal to or greater than the first viewport quality. In some embodiments, detecting the third time at which the viewport quality is comparable to the first viewport quality comprises detecting an increase in viewport quality after the second time.

In some embodiments, a method is provided of rendering a 360-degree video encoded as region-wise quality ranked (RWQR) encoded omnidirectional content. At a first time, while a viewport is in a first viewport position, at least a portion of a first representation of the video is rendered, the first representation having a high-quality region at least partially overlapping the first viewport position. At a second time, a change in viewport position to a second viewport position is detected. In response to the change in viewport position, A second representation of the video is retrieved, the second representation having a high-quality region that is different from the high-quality region of the first representation and at least partially overlapping the second viewport position. At a third time, rendering beings of at least a portion of the second representation. A latency between the second time and the third time is calculated and reported.

In some embodiments, a method includes rendering for a user at least a first-viewpoint representation of a 360-degree video. A selection of a second-viewpoint representation of the 360-degree video is received from the user. A viewpoint switching latency is measured, wherein the viewpoint switching latency represents a latency between a first time at which the user selects the second-viewpoint representation and a second time at which rendering of the second-viewpoint representation begins. The latency is reported, e.g. to a metrics server.

In some embodiments, a series of viewpoint-specific representations of a 360-degree video is rendered for a user. A list of rendered viewpoints corresponding to the rendered viewpoint-specific representations is generated, and the list of rendered viewpoints is reported in a rendered viewpoints metric. In some embodiments, a duration is measured over which each of the respective viewpoints is continuously presented, and the respective durations are reported in the rendered viewpoints metric.

In some embodiments, a viewport of a 360-degree video is rendered for a user, the viewport having a variable position and orientation. The user is enabled to select between (i) user control of the viewport position and orientation and (ii) automatic control of the viewport position and orientation using a recommended-viewport metadata track. One or more periods during which the user selects automatic control of the viewport position and orientation are identified. In a rendered recommended viewport metric, the periods during which automatic control of the viewport position and orientation is selected are reported. Durations of the periods may also be reported.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   rendering a first omnidirectional video associated with a first viewpoint;
   in response to a request to access an omnidirectional video associated with another viewpoint, recording, in a data record, a time of the request and information identifying the other viewpoint;
   identifying a time of switching into rendering of a second omnidirectional video associated with a second viewpoint; and
   reporting a viewpoint switching latency, representing a difference between the identified switching time and a request time extracted from the data record, the extracted request time is associated with information identifying the second viewpoint.

2. The method of claim 1, wherein the rendering of the first omnidirectional video comprises:
   rendering a portion of the first omnidirectional video to a viewport, including rendering an active set of one or more sub-pictures of the first omnidirectional video.

3. The method of claim 1, wherein the identifying of the time of switching comprises:
   detecting that a portion of the second omnidirectional video is rendered to a viewport.

4. The method of claim 1, wherein the identifying of the time of switching comprises:
   detecting that an active sub-picture set used for rendering includes one or more sub-pictures of the second omnidirectional video.

5. The method of claim 1, wherein the request comprises a request for one or more segments of the second omnidirectional video.

6. The method of claim 5, wherein each of the one or more segments corresponds to one or more subpictures of the second omnidirectional video.

7. The method of claim 5, wherein the one or more segments are determined based on a default omnidirectional video orientation or based on a user selected omnidirectional video orientation.

8. The method of claim 1, wherein the request comprises a request for segments of omnidirectional videos associated with reference viewpoints used for the rendering of an omnidirectional video associated with a virtual viewpoint.

9. The method of claim 1, wherein the request is initiated based on a user request or based on a user interaction with the scene.

10. The method of claim 1, wherein the extracted request time is the most recent one among request times, in the data record, that are associated with information identifying the second viewpoint.

11. A system, comprising:
    at least one processor; and
    memory storing instructions that, when executed by the at least one processor, cause the system to:
      render a first omnidirectional video associated with a first viewpoint,
      in response to a request to access an omnidirectional video associated with another viewpoint, record, in a data record, a time of the request and information identifying the other viewpoint,
      identify a time of switching into rendering of a second omnidirectional video associated with a second viewpoint, and
      report a viewpoint switching latency, representing a difference between the identified switching time and a request time extracted from the data record, the extracted request time is associated with information identifying the second viewpoint.

12. The system of claim 11, wherein the rendering of the first omnidirectional video comprises:
    rendering a portion of the first omnidirectional video to a viewport, including rendering an active set of one or more sub-pictures of the first omnidirectional video.

13. The system of claim 11, wherein the identifying of the time of switching comprises:
    detecting that a portion of the second omnidirectional video is rendered to a viewport.

14. The system of claim 11, wherein the identifying of the time of switching comprises:
    detecting that an active sub-picture set used for rendering includes one or more sub-pictures of the second omnidirectional video.

15. The system of claim 11, wherein the request comprises a request for one or more segments of the second omnidirectional video.

16. The system of claim 15, wherein each of the one or more segments corresponds to one or more subpictures of the second omnidirectional video.

17. The system of claim 15, wherein the one or more segments are determined based on a default omnidirectional video orientation or based on a user selected omnidirectional video orientation.

18. The system of claim 11, wherein the request comprises a request for segments of omnidirectional videos associated with reference viewpoints used for the rendering of an omnidirectional video associated with a virtual viewpoint.

19. The system of claim 11, wherein the request is initiated based on a user request or based on a user interaction with the scene.

20. The system of claim 11, wherein the extracted request time is the most recent one among request times, in the data record, that are associated with information identifying the second viewpoint.

21. A non-transitory computer-readable medium comprising instructions executable by at least one processor to perform a method, the method comprising:
    rendering a first omnidirectional video associated with a first viewpoint;
    in response to a request to access an omnidirectional video associated with another viewpoint, recording, in a data record, a time of the request and information identifying the other viewpoint;

identifying a time of switching into rendering of a second omnidirectional video associated with a second viewpoint; and reporting a viewpoint switching latency, representing a difference between the identified switching time and a request time extracted from the data record, the extracted request time is associated with information identifying the second viewpoint.

* * * * *